United States Patent [19]

Ewing

[11] Patent Number: 5,180,964
[45] Date of Patent: Jan. 19, 1993

[54] ZERO-VOLTAGE SWITCHED FM-PWM CONVERTER

[76] Inventor: Gerald D. Ewing, 800 Palm Ave., Seaside, Calif. 93955

[21] Appl. No.: 734,066

[22] Filed: Jul. 22, 1991

Related U.S. Application Data

[63] Continuation of Ser. No. 500,817, Mar. 28, 1990, abandoned.

[51] Int. Cl.$^5$ .............................................. G05F 1/613
[52] U.S. Cl. ..................................... 323/222; 323/223; 323/285
[58] Field of Search ............... 323/222, 223, 232, 282, 323/283, 285; 363/17, 98, 132

[56] References Cited

U.S. PATENT DOCUMENTS

| | | | |
|---|---|---|---|
| 4,160,945 | 7/1979 | Schorr | 323/17 |
| 4,392,103 | 7/1983 | O'Sullivan et al. | 323/222 |
| 4,415,959 | 11/1983 | Vinciarelli | 363/21 |
| 4,437,146 | 3/1984 | Carpenter | 363/21 |
| 4,510,400 | 4/1985 | Kiteley | 323/222 |
| 4,529,927 | 7/1985 | O'Sullivan et al. | 323/222 |
| 4,535,399 | 8/1985 | Szepesi | 363/97 |
| 4,564,820 | 1/1986 | Peruth et al. | 363/97 |
| 4,584,517 | 4/1986 | Schwab | 323/222 |
| 4,597,036 | 6/1986 | Paulik et al. | 363/97 |
| 4,639,849 | 1/1987 | Noworolski et al. | 363/132 |
| 4,683,529 | 7/1987 | Bucher | 323/222 |
| 4,700,285 | 10/1987 | Szepesi | 363/131 |
| 4,710,686 | 12/1987 | Guzik | 363/98 |
| 4,745,537 | 5/1988 | Cheung | 363/132 |
| 4,774,649 | 9/1988 | Archer | 363/131 |
| 4,777,578 | 10/1988 | Jahns | 363/132 |
| 4,777,579 | 10/1988 | Jahns | 363/98 |
| 4,866,367 | 9/1989 | Ridley et al. | 363/21 |
| 4,876,635 | 10/1989 | Park et al. | 363/17 |
| 4,882,532 | 11/1989 | Garibaldi et al. | 323/222 |
| 4,912,622 | 3/1990 | Steigerwald et al. | 363/132 |
| 4,929,882 | 5/1990 | Szepsi | 323/222 |
| 4,937,725 | 6/1990 | Dhyanchand et al. | 363/98 |
| 4,939,633 | 7/1990 | Rhodes et al. | 363/98 |
| 4,942,509 | 7/1990 | Shires et al. | 323/222 |
| 4,950,974 | 8/1990 | Pagano | 323/222 |
| 4,959,764 | 9/1990 | Bassett | 323/222 |

Primary Examiner—Steven L. Stephan
Assistant Examiner—Jeffrey Sterrett
Attorney, Agent, or Firm—Skjerven, Morrill, MacPherson, Franklin & Friel

[57] ABSTRACT

A variable-frequency pulse-width-modulated D-C to D-C converter allows operation at very high frequencies with minimal power transistor switch transient turn-on losses. A frequency control scheme is utilized wherein the controller of the converter causes switching to occur when the voltage across the power transistor switch is near zero volts. In addition to reducing transient turn-on losses, zero-voltage switching reduces noise generation in the circuit and simplifies the power transistor drive requirements.

Other characteristics of opimal power transistor switch utilization are met in addition to turning the switch on under a zero potential. Maximum peak voltage across the switch is limited to approximately the ouput or input voltage level depending on the configuration used. In addition, peak and average currents through the switch are proportional to output power requirements and turn off transient dissipation is held to a minimum.

13 Claims, 23 Drawing Sheets

ZERO-VOLTAGE SWITCHED FM-PWM CONVERTER

This application is a continuation of application Ser. No. 07/500,817, filed Mar. 28, 1990, now abandoned.

BACKGROUND OF THE INVENTION

1. Field of the Invention

The invention relates to D-C to D-C converters and more particularly to zero-voltage switched regulated converters having high conversion efficiency at high operating frequencies and having a small physical size and weight.

2. Description of the Relevant Art

Non-dissipating power converters fall into two general categories: pulse-width modulated converters and resonant or quasi-resonant frequency modulated converters. Pulse width modulated converters operate in a constant-frequency, variable pulse-width mode (PWM) and resonant or quasi-resonant converters operate in a constant pulse-width, variable frequency mode.

A schematic of a basic boost PWM converter is shown in FIG. 1. The boost converter comprises an input capacitor 10, an output capacitor 11, an inductor 12, a MOS field-effect transistor (MOSFET) 13, and a diode 14. The gate of MOSFET 13 is connected to a control circuit 16 which controls the conducting and non-conducting states of MOSFET 13. When an input source (not shown) is connected at the $V_{in}$ terminals, an output voltage is available across a load 15.

The ideal boost PWM converter operates in three basic steps as shown in the modelled circuits of FIGS. 1(a), 1(b), and 1(c). MOSFET 13 is modelled within FIGS. 1(a), 1(b) and 1(c) as a power switch 13a controlled by control 16. During the first step, referred to as the inductor charge stage and modelled by the circuit of FIG. 1(a), switch 13a is closed in response to control circuit 16 and the current through inductor 12 rises linearly to a maximum level when switch 13a is opened. Output power is supplied to a load 15 with energy previously stored in output capacitor 11.

During the second step, referred to as the induction discharge stage and modelled by the circuit of FIG. 1(b), switch 13a is opened and the voltage across inductor 12 changes polarity and rises to the difference between the input voltage level and the output voltage level. The energy stored by inductor 12 is linearly discharged into load 15. During this time, the input source is also supplying energy to load 15 and charges output capacitor 11.

During the third step, referred to as the dead time stage and modelled by the circuit of FIG. 1(c), inductor 12a has been 12 completely depleted of its energy and power switch 13a is still open. During this step, pass diode 14 (shown in FIG. 1) prevents the flow of current from output filter capacitor 11 back to the input source. Output power is supplied to load 15 by output capacitor 11.

Each of the three steps of the ideal boost PWM converter may be described in conjunction with the current and voltage relationships at inductor 12 and power switch 13a. FIGS. 1(d)-1(f) show graphs of the gate drive voltage $V_g$ to MOSFET 13 versus time, the current $I_L$ through inductor 12 versus time, and the voltage $V_L$ across inductor 12 versus time. FIGS. 1(g)-1(i) show graphs of the gate drive voltage $V_g$ to MOSFET 13 versus time, the current $I_s$ through power switch 13a versus time, and the voltage $V_s$ across power switch 13a versus time.

During step 1 when power switch 13a is closed (when the gate drive voltage $V_g$ is at level $V_{gate}$), the current through inductor 13 rises linearly to a level $I_{peak}$ defined by the applied input voltage and the circuit impedance. The voltage across inductor 12 is approximately equal to the input voltage $V_{in}$. The voltage across power switch 13a is negligible.

When control circuit 16 removes the gate drive pulse $V_g$, power switch 13a opens and the voltage $V_L$ across inductor 12 falls to a level such that pass diode 14 is forward biased. Thus, energy passes through pass diode 14 to load 15. At this time, the voltage across inductor 12 is the difference between the output voltage and the input voltage, and the voltage $V_s$ across power switch 13a rises to the output voltage level.

The energy stored in inductor 12 during the time when power switch 13a was closed is gradually depleted. Diode 14 blocks the back flow of current from the output terminals into the input source. At this time, the current through and the voltage across inductor 12 is zero, and the voltage across switch 13a is at the input voltage level. In succession, controller 16 applies another gate drive voltage and the cycle is repeated.

The amount of energy transferred to the output (load is dependent upon the amount of time that switch 13a is closed, called the pulse-width, and the amount of time required to discharge inductor 12. Faraday's law states that the volt-second product of an inductor must be equal for both the charge and discharge cycles. If the time to charge inductor 12 is called ton and the discharge time is called $t_d$, then the volt-second product of the inductor is written $$V_i t_{on} = (V_o - V_i) t_d. \tag{1}$$

Solving $V_o$ the equation for the voltage conversion ratio, $V_i$, one obtains, $$\frac{V_o}{V_i} = \frac{t_{on} + t_d}{t_d}. \tag{2}$$

Replacing the times $t_{on}$ and $t_d$ by normalized values $d_1$ and $d_2$ where $d_1$ is the ratio of the on-time to the total switch period and $d_2$ is the ratio of the discharge time to the total switch period, then $$\frac{V_o}{V_i} = \frac{d_1 + d_2}{d_2}. \tag{3}$$

The voltage conversion ratio can also be expressed as a function of output load 15. Since the boundary conditions on inductor 12 are equal for both charge and discharge periods, i.e., they both have a peak value of $I_p$ and a minimum value of zero, the average current for both periods are equal. The average current through inductor 12 is one half of the peak value since it is triangular in shape. The peak value of the current occurs at the end of the on period and is given by $$I_p = \frac{V_i t_{on}}{L} \tag{4}$$

resulting in an average current during charge of $$I = \frac{V_i t_{on}}{2L}. \tag{5}$$

The average current during discharge is given by $$I = \frac{V_o}{R} \frac{T}{t_d} \tag{6}$$

where R is the resistance of load 15 and T is the total switching period. Equating equations (5) and (6) yields a voltage conversation ratio of $$\frac{V_o}{V_i} = \frac{t_{on} t_d R}{2LT} = \frac{d_1 d_2 TR}{2L} \tag{7}$$

This equation is used for determining the range of values for which the converter will operate in the discontinuous mode, and is used for determining the proper size inductor for a given load to maintain regulation at the desired operating frequency.

Further descriptions of the basic boost PWM converter as well as for other converter techniques may be found in the following references, which are incorporated herein by reference: K. Liu, "High-frequency quasi-resonant converter techniques," Ph.D. Dissertation, Electrical Engineering Department, Virginia Polytechnic Institute and State University, 1986; John G. Kassakian and Martin F. Schlecht, "High-frequency high-density converters for distributed power supply systems," *IEEE Proceedings*, v. 36, no. 4, pp. 362–376, April 1988; Fred C. Lee, "High-frequency quasi-resonant converter technologies," *IEEE Proceedings*, v. 36, no. 4, pp. 337–390, April 1988; Eugene R. Hnatek, *Design of Solid-State Power Supplies*, Second Edition, Van Nostrand Reinhold Company, 1981; and George C. Chryssis, *High-Frequency Switching Power Supplies, Theory and Design*, Second Edition, McGraw Hill Publishing Co., New York, 1989.

For converter circuits in general, it has been a goal to minimize switching losses at high frequencies. Additional goals include minimizing stress on switching elements and minimizing unwanted electromagnetic interference.

For an ideal converter, optimal characteristics would be achieved by meeting the five following basic criteria: 1) turning the power switch on with zero voltage across it; 2) turning the power switch off when zero current is flowing through it; 3) minimizing the current flow for given load requirements; 4) minimizing the maximum voltage across the power switch; and 5) minimizing the peak-to-average current ratio through the power switch. Unfortunately, an ideal converter meeting all these basic criteria is currently unavailable in practice.

The ability to switch under a zero drain-to-source MOSFET potential allows a basic PWM converter to attain switching frequencies in the range of several megahertz without undergoing turn-on losses in the switch. The motivation for operation at higher frequencies is that as frequency increases, the energy storage elements in the converter become smaller and thus the converter can be packaged in a smaller volume. In addition, operation at higher frequencies increases the transient response of the regulated converter. Increased transient response allows the converter to respond more quickly to load variations. Furthermore, the gate drive power is markedly reduced when the power switch is turned on under zero voltage because there is no Miller effect capacitance.

For the basic PWM boost converter of FIG. 1, losses are generated when the energy stored in the drain-to-source capacitance of MOSFET 13 is dissipated at turn-on. With a typical circuit capacitance of 200 pF, a power switch operating at 1 MHz boosting in a discontinuous mode from 150 volts to 300 volts could be expected to dissipate 2.25 watts. For operations in the 5 MHz range, power dissipation could exceed 12.5 watts. For continuous mode regulators, losses would be 9 and 45 watts respectively. This level of power dissipation cannot be tolerated in an efficient converter.

Zero voltage switching is achieved with the zero-voltage switched family of quasi-resonant converters. However, the maximum voltage across the switch in a zero-voltage switched quasi-resonant converter is over twice the output voltage of the converter. This requires that the switch be designed for the peak voltage which is twice the output voltage. A switch having a higher voltage capability typically has increased channel resistance, resulting in increased conduction losses.

For the PWM converter, the peak voltage across the switch is equal to the output voltage. Hence, conduction losses are minimized in PWM converters.

The ability to turn off under zero current allows the transient dissipation of the switch to be zero at turn-off because the product of voltage and current through the switch is zero when the switch is commutated. The zero-current switched family of resonant converters provide this type of characteristic.

The optimal waveform for transferring energy through a power switch is a square current waveform proportional to the required output current. The PWM converter of FIG. 1 has a triangular shaped current waveform with the peak value of current occurring at turn-off. The value of the peak current level is proportional to the required output current to supply the given load. The zero-current switched resonant converter family utilizes a half-sinusoid current waveform with constant amplitude, regardless of the magnitude of output requirements. The zero-voltage switched family of quasi-resonant converters yields a fairly square current pulse, but is independent of load and is based on the maximum load requirement.

As indicated above, neither the basic PWM boost converter nor the resonant or quasi-resonant converter families provide for each of the five basic criteria for optimal operating characteristics. A D-C to D-C converter which provides for a more optimal operation is desirable.

SUMMARY OF THE INVENTION

A variable-frequency pulse-width-modulated boost converter is provided which allows for operation at very high frequencies with minimal transient turn-on losses. A frequency control scheme is utilized where the controller for the converter causes switching to occur when the voltage at the drain of the MOSFET is near zero volts. In addition to reducing transient turn-on losses, zero-voltage switching reduces noise generation in the circuit and simplifies the gate drive requirements.

Other optimal characteristics for D-C to D-C converters are met in addition to turning the switch on under a zero drain-to-source potential. Maximum peak voltage across the switch is limited to the output voltage level. In addition, peak and average currents through the switch are proportional to output power requirements.

According to a first embodiment of the invention, a D-C to D-C converter circuit comprises a first inductive means coupled to receive input power from an input line. A switching means is coupled to the first inductive means for controlling the transfer of power from the first inductive means to an output line. A current sensing means is coupled to the first inductive means for providing an output signal indicative of the voltage across the first inductive means to reset (trigger) a controller circuit which controls the switching means.

According to a second embodiment of the invention, a D-C to D-C converter circuit comprises a first inductive means coupled to receive input power from an input line. A switching means is coupled to the first inductive means for controlling the transfer of power from the first inductive means to an output line. A voltage sensing means is coupled to the switching means for providing an output signal indicative of the voltage across the switching means to reset a controller circuit which controls the switching means.

According to a third embodiment of the invention, a D-C to D-C converter circuit comprises a transformer having a primary winding and a secondary winding, the primary winding coupled to receive input power from an input line and the secondary winding coupled to the output line. A switching means is coupled to the transformer for controlling the transfer of power from the primary winding to the secondary winding. A current sensing means is coupled to the transformer for providing an output signal indicative of the current flowing through the primary of the transformer to reset a controller circuit which controls the switching means.

According to a fourth embodiment of the invention, a D-C to D-C converter circuit comprises a transformer having a primary winding and a secondary winding, the primary winding coupled to receive input power from an input line and the secondary winding coupled to the output line. A switching means is coupled to the transformer for controlling the transfer of power from the primary winding to the secondary winding. A voltage sensing means is coupled to the switching means for providing an output signal indicative of the voltage across the switching means to reset a controller circuit which controls the switching means.

The invention will be more readily understood by reference to the drawings and the detailed description. As will be appreciated by one skilled in the art, the invention is applicable to switching converter circuits in general, and is not limited to the specific embodiments disclosed.

DETAILED DESCRIPTION OF THE INVENTION

Figure 2:
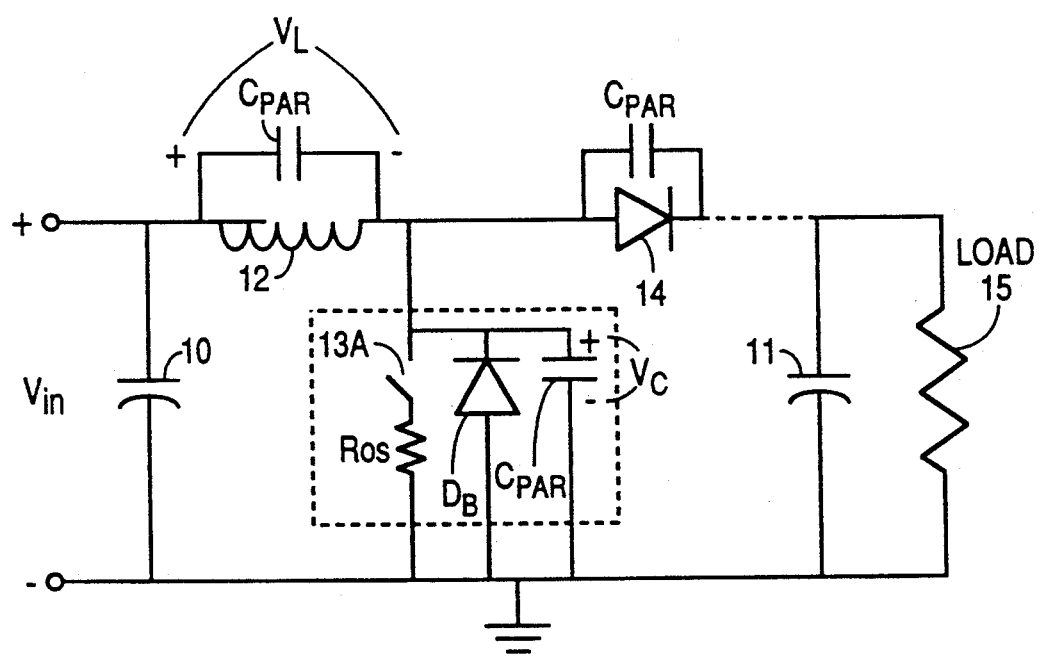
FIG. 2 shows a non-ideal PWM boost converter circuit.

FIG. 2 shows a schematic of a non-ideal boost converter. For the non-ideal converter, parasitic capacitance $C_{PAR}$ is present in inductor 12, MOSFET 13, and pass diode 14. In addition to the discreet inductor 12, stray inductance is present throughout the circuit. In addition to power switch 13a and the parasitic capacitance, MOSFET 13 is further modelled with a reverse body diode $D_B$ across its drain and source. Conduction resistance $R_{DS}$ is modelled in series with the drain and source.

Figure 3:
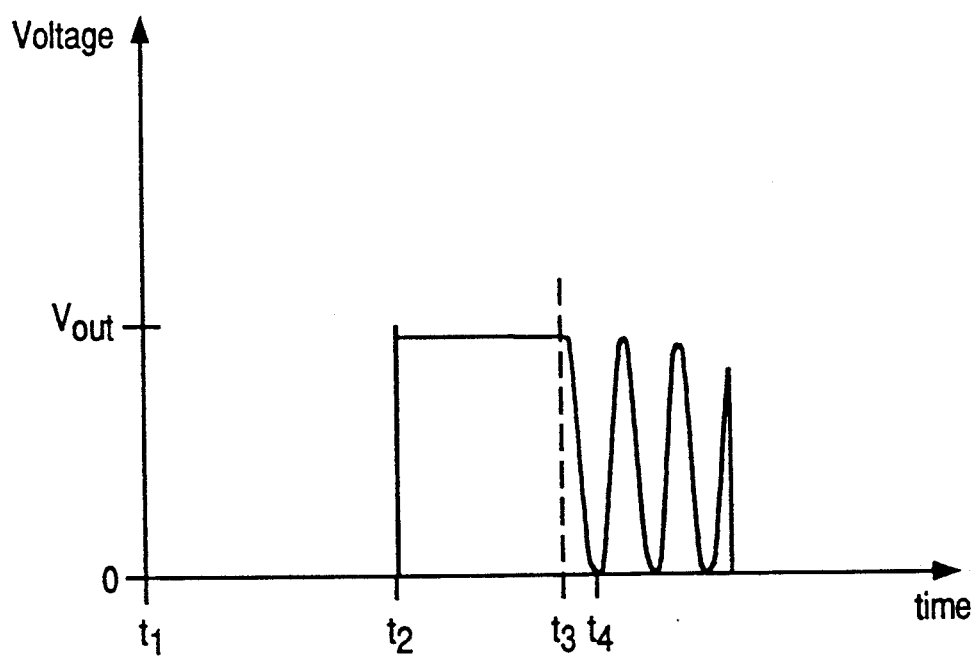
FIG. 3 shows the voltage across the switch versus time for the non-ideal boost converter operating in a constant pulse-width., variable frequency mode.

The parasitic elements inherent within the discreet devices cause the ideal waveforms of FIGS. 1(d)-1(i) to vary during the transitional periods of switch 13a activity. FIG. 3 shows the voltage across switch 13a versus time for the non-ideal boost converter of FIG. 2 operating in a constant pulse-width variable frequency mode. In this case, the converter is arranged such that the output voltage is twice the input voltage. Scaling of the waveform is 20 volts per vertical division and 2 $\mu$S per horizontal division. During the time when switch 13a is closed from $t_1$ to $t_2$, the voltage across the switch is approximately zero. During this time, current in inductor 12 is ramping up and charging inductor 12.

When switch 13a is opened, the voltage across switch 13a makes a rapid transition to a voltage equal to the output voltage. Diode 14 effectively clamps the voltage to be constant at the output voltage level set by the load conditions. The time from $t_2$ to $t_3$ is the time required for inductor 12 to discharge its energy into capacitor 11 and load 15. When that energy is transferred and the current in inductor 12 diminishes to zero, the parasitic capacitance of switch 13a and the stray capacitance across switch 13a is charged to a level equal to the output voltage. Since this charge may only discharge back into inductor 13a, sinusoidal ringing occurs.

It is noted that the ringing voltage falls to zero at a time $t_4$. Even if the converter is arranged such that the output voltage is greater than twice the input voltage, the ringing voltage does not fall significantly below zero due to the reverse body diode $D_B$ inherent within MOSFET 13. In such a case, the body diode conducts at the lower peaks of the ringing voltage. Hence, the lower peaks are clamped to a level of approximately zero volts.

The oscillation occurs until the parasitic and stray capacitances across MOSFET 13 charge down to a level equal to the input voltage or until switch 13a is reclosed to repeat the process. The energy dissipated in switch 13a at turn-on is proportional to the square of the voltage level across it.

As stated earlier, to minimize transient switching losses, switch 13a should be closed when there is a voltage level of zero across it. In accordance with the invention, switch 13a is closed at the instance when the ringing voltage reaches zero to minimize turn-on transient loss.

Figure 1:
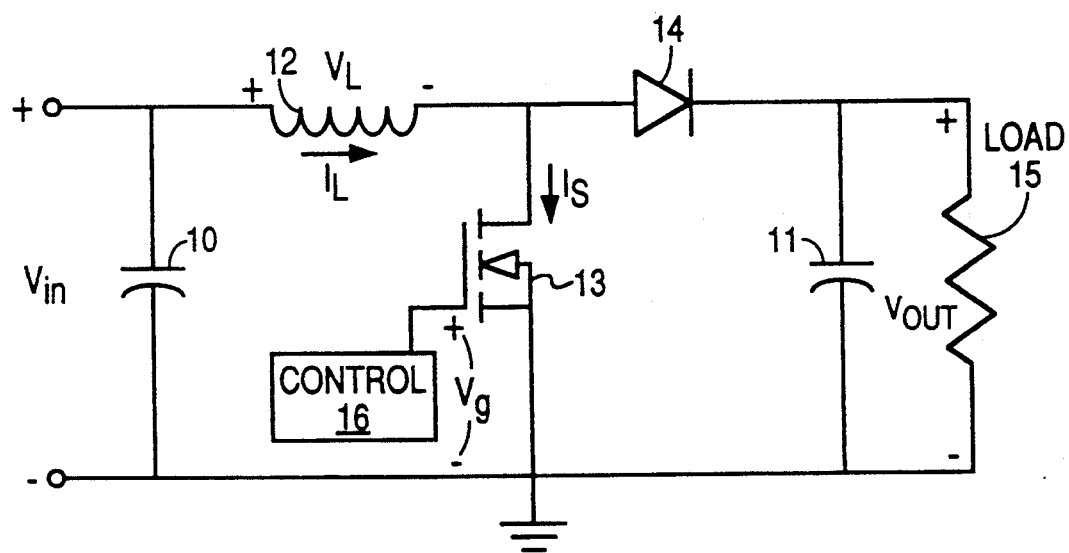
FIG. 1 (Prior Art) is a schematic of a basic PWM boost converter circuit.
Figure 1A:
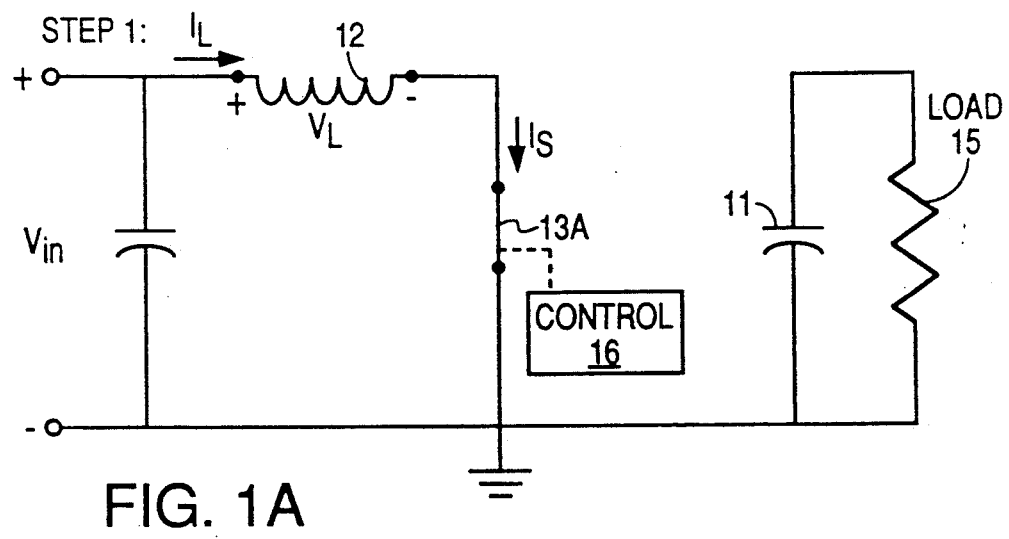
FIGS. 1(a)-1(c) show model circuits during steps of operation of an ideal PWM boost converter circuit.
Figure 1B:
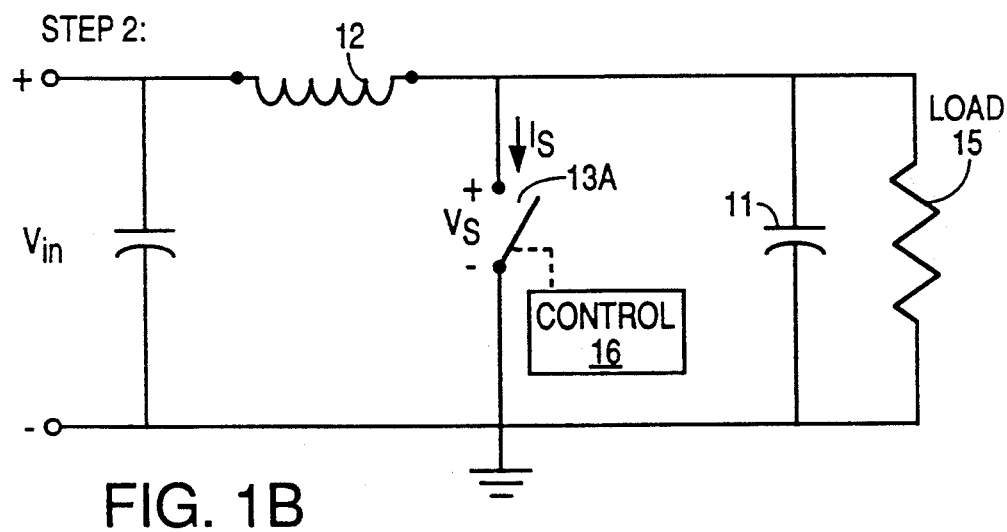
Figure 1C:
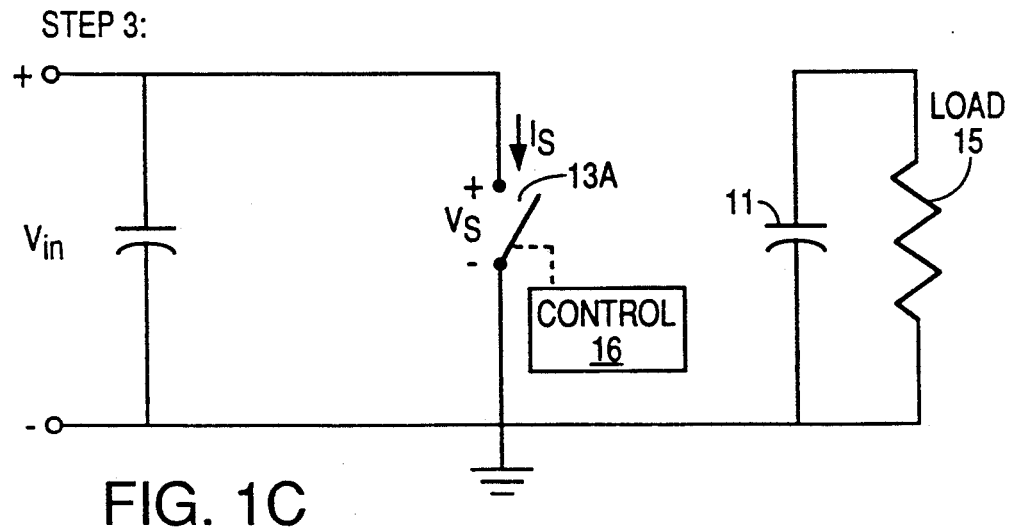
Figure 1D:
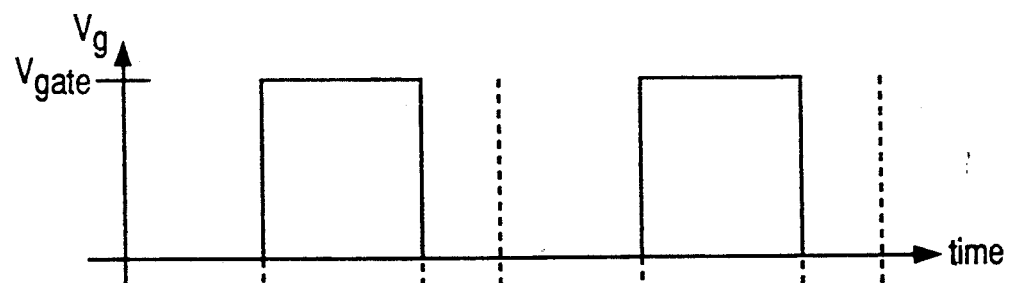
FIGS. 1(d)-1(f) illustrate the gate voltage, inductor current, and inductor voltage levels versus time for the ideal PWM boost converter circuit.
Figure 1E:
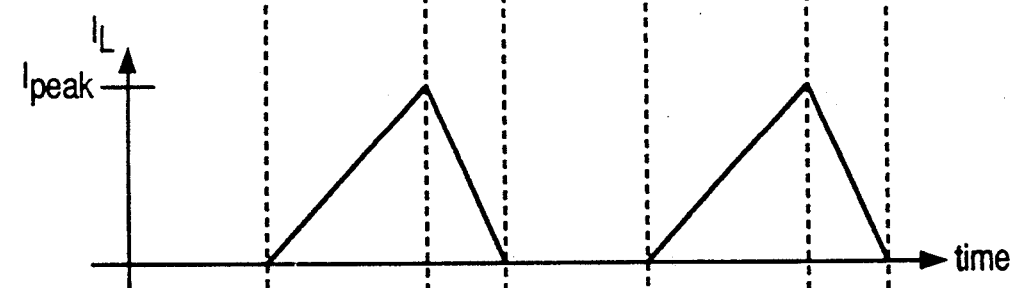
Figure 1F:
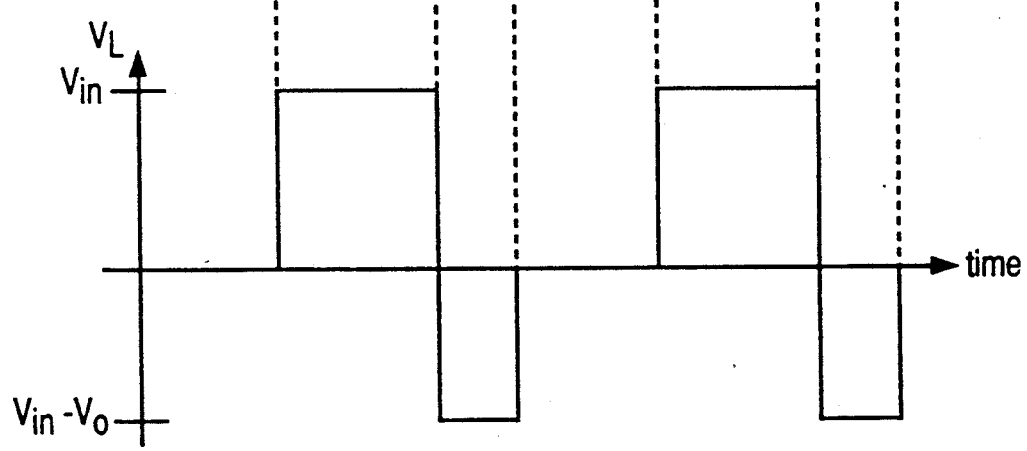
Figure 1G:
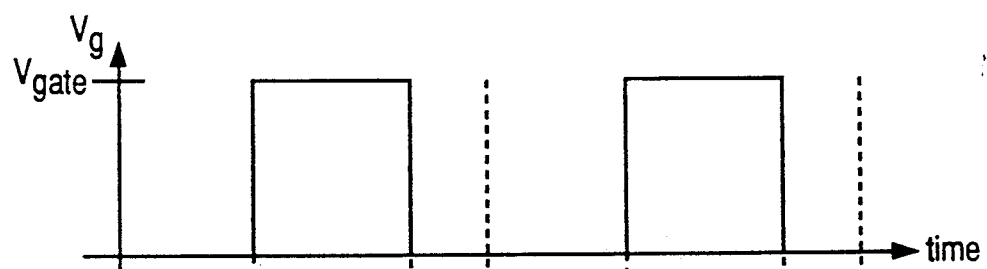
FIGS. 1(g)-1(i) illustrate the gate voltage, switch current, and switch voltage levels versus time for the ideal PWM boost converter circuit.
Figure 1H:
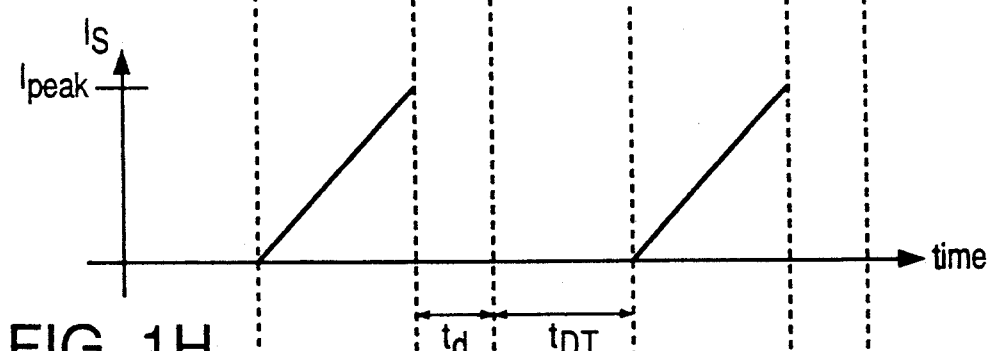
Figure 1I:
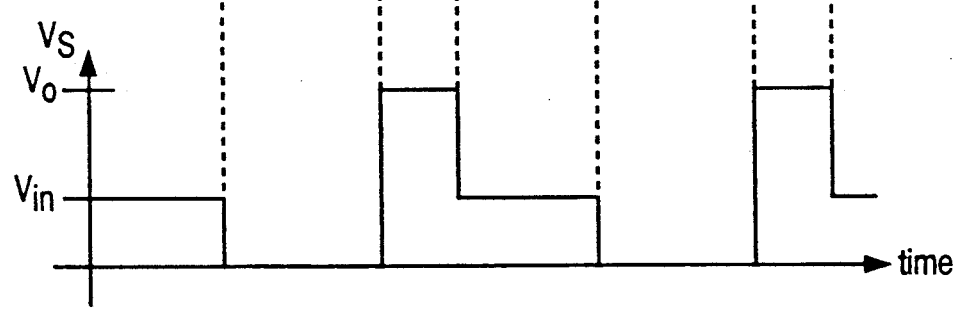
Figure 4:
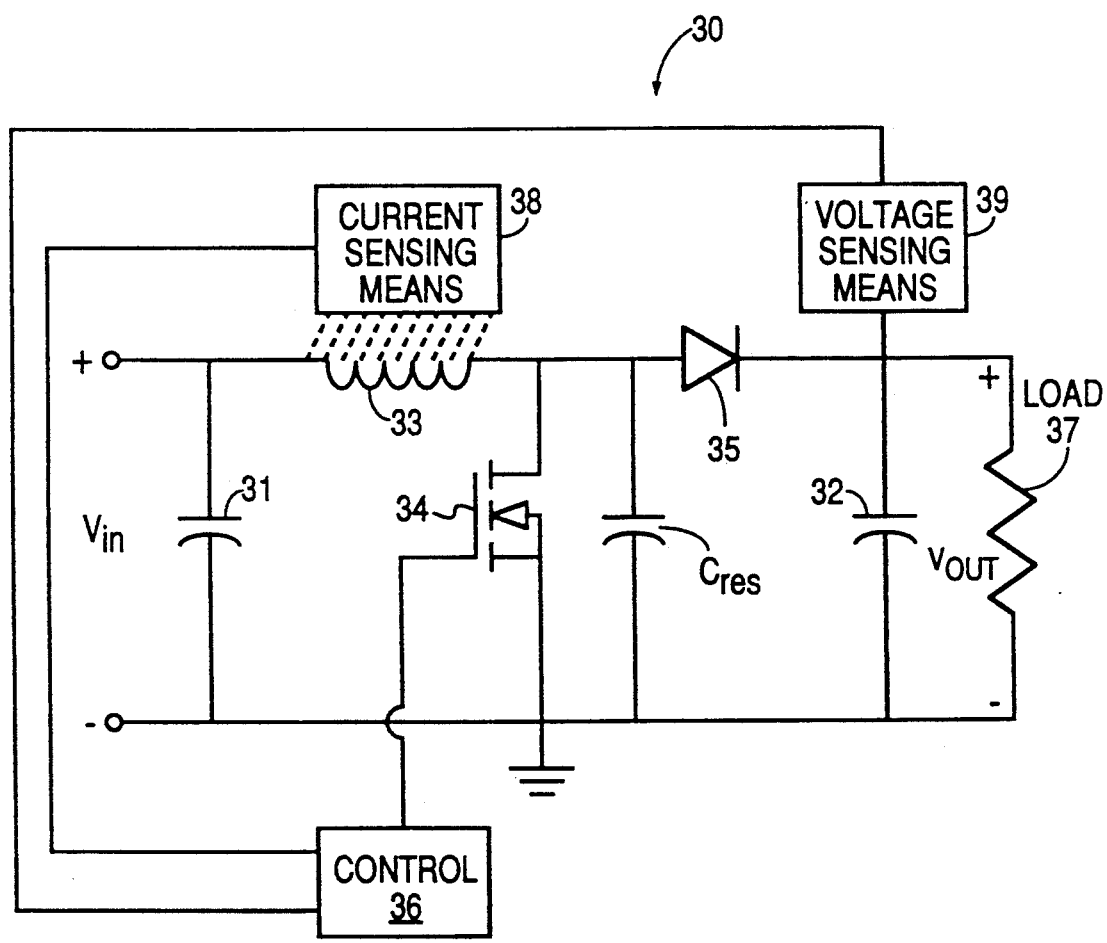
FIG. 4 shows a block diagram of a zero-voltage switched boost converter according to the present invention.

FIG. 4 shows a block diagram of a zero-voltage switched boost D-C to D-C converter 30 according to the present invention. Converter 30 provides zero-voltage turn-on when the ringing voltage as explained above falls to approximately zero. The components of the basic boost PWM converter shown in FIG. 1 are incorporated within converter 30. These components include capacitors 31 and 32, inductor 33, MOSFET 34, and pass diode 35. Likewise, a control 36 is provided which is connected to the gate of MOSFET 34 and controls the switching. In addition, a load 37 is connected at the output terminals.

In accordance with the invention, converter 30 further comprises a current sensing means 38, a voltage sensing means 39, and a capacitor $C_{res}$. Control 36 is connected to and is responsive to current sensing means 38 and voltage sensing means 39. Current sensing means 38 is coupled to inductor 33 and is responsive to the current flowing through inductor 33. Voltage sensing means 39 is coupled to and is responsive to the voltage level across output load 37. Capacitor $C_{res}$ is connected across the drain and source of MOSFET 34.

In operation, current sensing means 38 provides a reset signal, or trigger signal, which is received at control 36 In response to the reset signal, control 36 resets and correspondingly generates a gate pulse which causes MOSFET 34 to turn on.

The time at which current sensing means 38 provides the reset signal is critical. In one embodiment of the invention, control 36 is characterized by having a significant inherent delay from the time a reset pulse is received at one of its input lines to the time when the gate pulse is provided from an output line to MOSFET 34. Accordingly, referring back to FIG. 3, in order to turn on MOSFET 34 when the ringing voltage is equal to zero, and taking into account the delay of control 36, the reset signal must be provided to control 36 in advance of the ringing voltage actually reaching zero. Current sensing means 38 is accordingly configured to sense the current flowing through inductor 33 and to provide a reset signal to control 36 at a time prior to the time at which the ringing voltage across MOSFET 34 reaches zero.

Voltage sensing means 39 provides a feedback regulating signal to control 36. Voltage sensing means 39 and control 36 operate cooperatively to maintain a regulated output voltage, and their cooperative operation is known to those skilled in the art.

Capacitor $C_{res}$ is provided to minimize turn-off transient losses. As stated above, it is desirable to turn off a power switch when zero current is flowing through it Although there is current flowing through MOSFET 34 when it is turned off, capacitor $C_{res}$ minimizes turn-off transient loss since the voltage level across MOSFET 34 cannot rise instantaneously but instead must rise relatively slowly compared with the rapid decrease of the drain current to a zero level. As a consequence, the voltage across MOSFET 34 does not have time to increase significantly before current through it decreases to zero. Turn-off transient power dissipation is thus reduced to a very low level since it is proportional to the time integral of the instantaneous switch voltage and current product.

Figure 5:
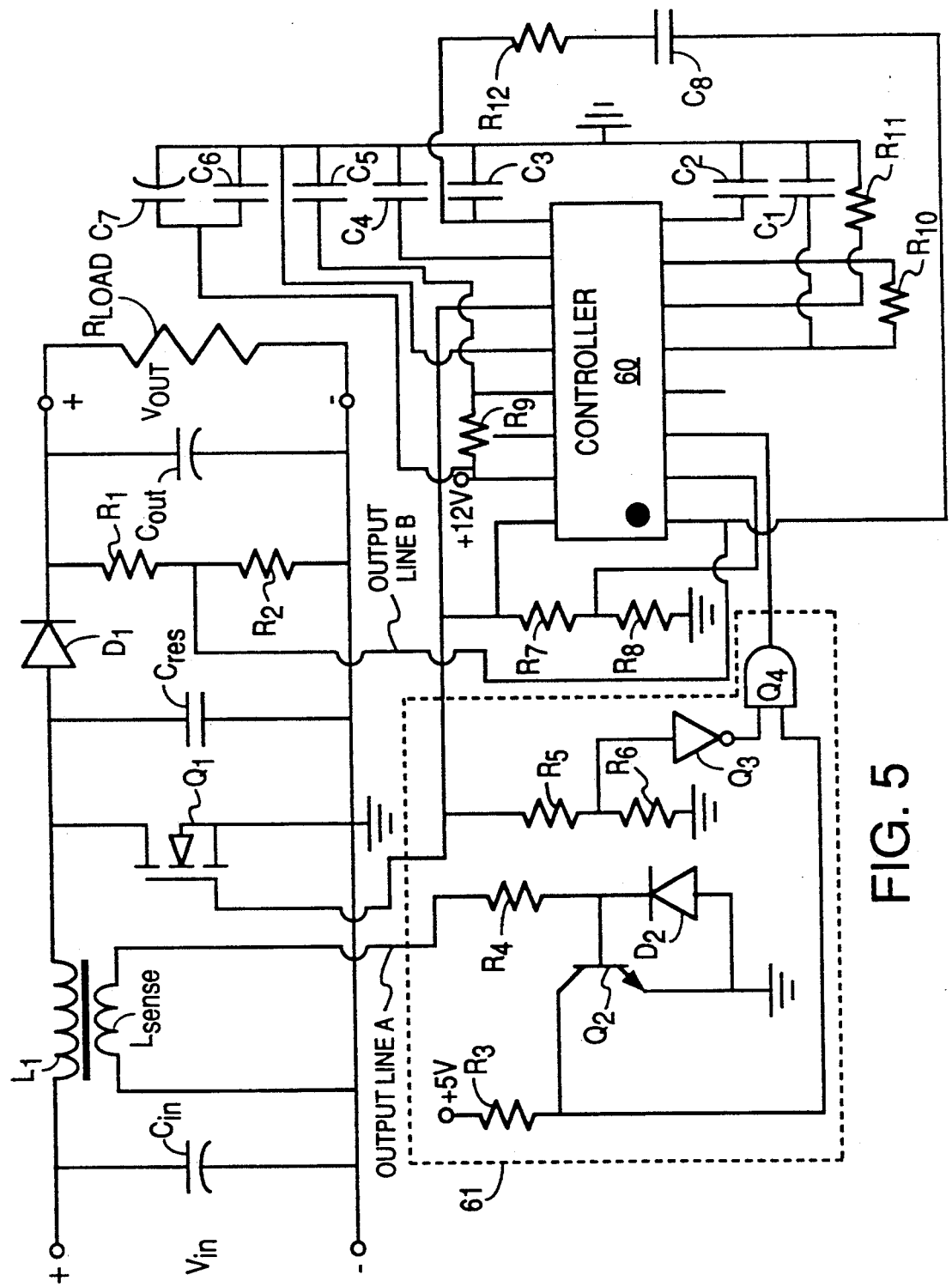
FIG. 5 shows a schematic of a zero-voltage switched boost converter according to the present invention.

Referring next to FIG. 5, a detailed schematic of an embodiment of the invention is shown. In this embodiment, an inductor $L_{sense}$ is a current sensing means and is magnetically coupled to an inductor $L_1$. A reset signal is provided from inductor $L_{sense}$ at output line A. Capacitors $C_{in}$ and $C_{out}$, a diode $D_1$, inductor $L_1$, and a MOSFET $Q_1$ are connected in accordance with a basic boost converter configuration. Resistors $R_1$ and $R_2$ are connected as a voltage divider and form a voltage sensing means which provides an output signal at output line B to a controller 60 for regulation of the output voltage across a load $R_{load}$.

Figure 6:
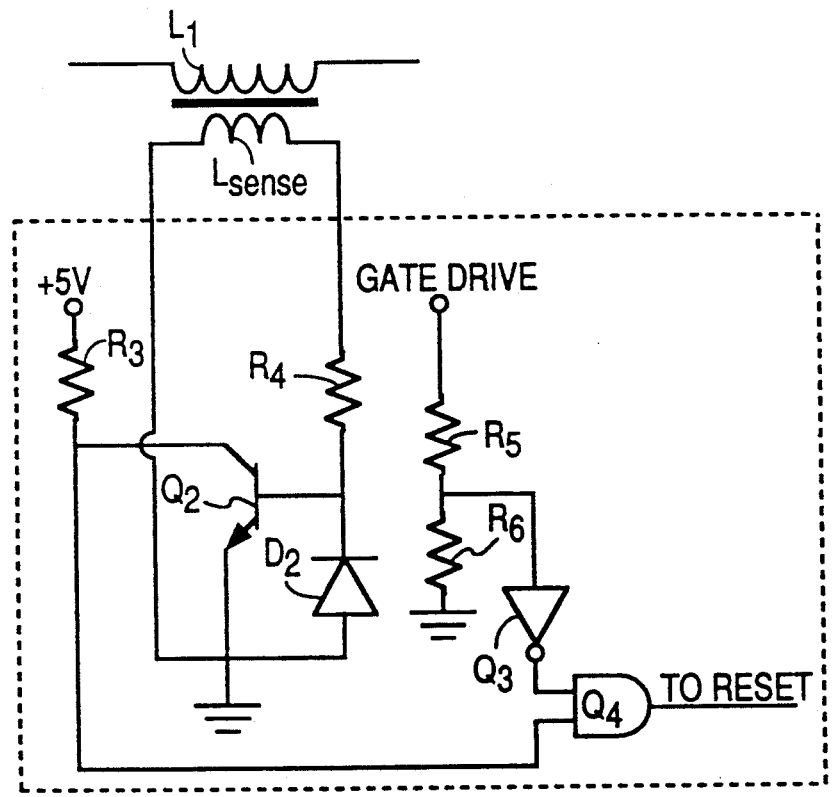
FIG. 6 is a schematic of a reset signal conditioning means.

A reset signal conditioning means 61 is connected to output line A and to controller 60. Signal conditioning means 61 provides a conditioned reset signal to controller 60 which is logic HIGH only when the reset signal at output line A crosses the zero voltage level and when no gate drive pulse is applied to MOSFET $Q_1$. Signal conditioning means 61 is shown separately in FIG. 6. Resistors $R_3$, $R_4$, $R_5$, and $R_6$, transistor $Q_2$, inverter $Q_3$, NAND gate $Q_4$, and diode $D_2$ comprise signal conditioning means 61 in this embodiment.

Signal conditioning means 61 could be implemented using a variety of other components or circuit configurations. The specific components used within signal conditioning means 61 of this embodiment serve exemplary purposes only and in no way limit the scope of the present invention.

Referring back to FIG. 3, it is evident that when the ringing voltage across MOSFET $Q_1$ first falls below the input voltage level, the direction of current through inductor $L_1$ reverses, and accordingly, the output line of NAND gate $Q_4$ goes HIGH. When NAND gate $Q_4$ goes high, the signal is received by controller 60, which in turn generates a gate pulse signal which is received by MOSFET $Q_1$ after a time delay as explained earlier. This time delay is such that when MOSFET $Q_1$ turns on, the ringing voltage has reached or is approximately at the zero voltage level. Thus, zero-voltage turn-on is achieved, and turn-on transient losses are minimized.

The following is a list of component values and other parameters of a boost D-C to D-C converter of FIG. 5 which attains zero-voltage switching:

$V_{in}$ = 33–42 volts
$C_{in}$ = 30 μF $L_1 = 467 \mu H$
$L_{sense} = 10$ turns
$D_1 = MUR\ 410$
$D_2 = 1N914$
$Q_1 = BUZ\ 60$
$Q_2 = 2N3252$
$Q_3 = 74LS04N$
$Q_4 = 74S08N$
$R_1 = 91\ k\mu$
$R_2 = 5.1\ k\mu$
$R_3 = 510\ \mu$
$R_4 = 1\ k\mu$
$R_5 = 10\ k\mu$
$R_6 = 10\ k\mu$
$R_7 = 150\ \mu$
$R_8 = 10\ k\mu$
$R_9 = 2.7\ \mu$
$R_{10} = 10\ \mu$
$R_{11} = 3.9\ k\mu$
$R_{12} = 100\ k\mu$
$R_{load} = 1\ k\mu$
$C_1 = 0.005\ \mu F$
$C_2 = 0.68\ \mu F$
$C_3 = 0.02\ \mu F$
$C_4 = 0.08\ \mu F$
$C_5 = 0.68\ \mu F$
$C_6 = 0.68\ \mu F$
$C_7 = 6.8\ \mu F$
$C_8 = 0.68\ \mu F$
Controller = SG3525 (Texas Instruments)

Figure 7:
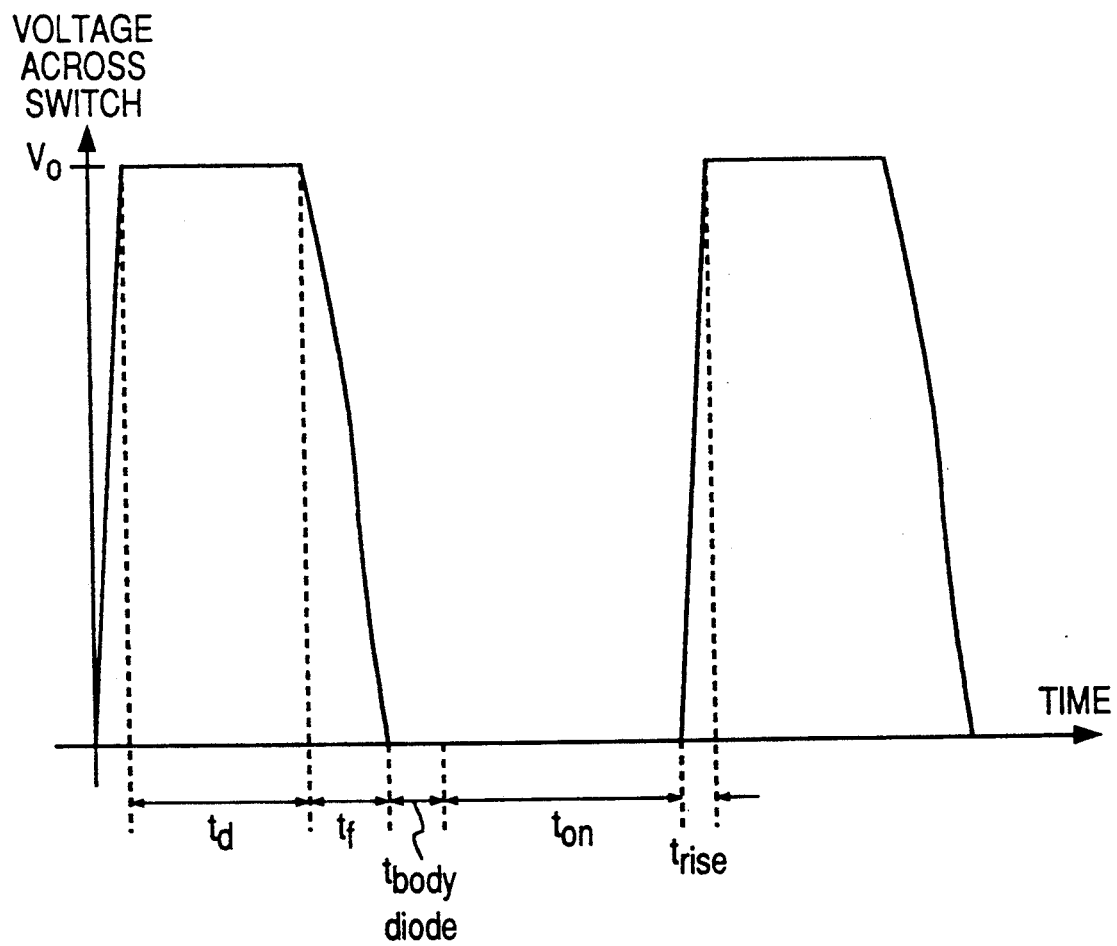
FIG. 7 shows the periods of a boost cycle.

For a complete analysis of the boost cycle of the converter shown in FIG. 5 and to determine the component values required, the cycle must be divided into five distinct times defined by the switch potential (the voltage across MOSFET $Q_1$). These periods are referred to as the on-time, rise-time, discharge time, resonant ringdown time, and the body diode conduction time. FIG. 7 illustrates these time periods.

In an ideal boost PWM converter circuit, switch voltage falls to the input level after the inductor has released its energy. In the case where the parasitic elements play a part in determining the waveform, the voltage across the switch falls below the level of the input voltage and resonates in a damped sinusoidal manner.

The level to which the voltage falls is determined by the difference between the input and output voltage levels. In the case of the zero-voltage switched converter, the output voltage level must be at least twice the input voltage. In general, when the resonant ringdown period commences, the switch voltage will drop to the value $$V_{SW} = 2V_{in} - V_{out}. \tag{8}$$

When a MOSFET is used as the switching device, the body diode will clamp the voltage at a slight negative value, maintaining the switch potential near zero volts. If a bipolar device is used, an anti-parallel diode is required across the switch to allow the voltage to be clamped near the zero level.

The fraction of time during which the switch is on relative to the total period establishes the output voltage level. It is usually chosen by the designer to be within a range of values such that expected load changes in the output or varying input voltages have minimal effect on the ability of the converter to remain in regulation. As will be discussed, the period of time the switch is on is critical in the design of a zero-voltage switched boost regulator due to the technological limitations on PWM regulator circuits.

The energy stored in inductor $L_1$ during the switch's on period is given by $$E_L = \tfrac{1}{2} L I_p^2 \tag{9}$$

where $I_p$ is the peak current in the inductor. The charging current during this period is linear, and the peak value of current is determined from $$v = L \frac{di}{dt} \tag{10}$$

The peak current will occur when the switch is opened, where the total on time is defined as $t_{on}$. The peak current is expressed as $$I_p = V_i \frac{t_{on}}{L}. \tag{11}$$

Substituting into equation (9), the inductor energy is $$E_L = \frac{V_i^2 t_{on}^2}{2L} \tag{12}$$

This energy in combination with the input supply are the sources of power for the load during the inductor discharge period.

The period of time from the opening of the switch to the point where the switch potential has reached its maximum is called the rise-time. This time is characterized by closing the MOSFET drain-to-source channel against a flow of current. This current must be re-routed through the pass diode and transferred to the load. It is at this time that transient turn-on dissipation occurs as the switch potential rises while a current flow still exists in the channel.

The rise in potential of the switch is synonymous with a rise in the drain-to-source capacitance voltage. The energy stored in inductor $L_1$ during the period the switch is on is much greater than the energy required to charge the parasitic capacitance to the output voltage, $$\frac{V_i^2 t_{on}^2}{2L} > \tfrac{1}{2} C V_0^2. \tag{13}$$

Inductor $L_1$ acts as a constant current source during this short time period following turn-off such that the relationship between the peak value and the time involved is written as $$I_p \approx C \frac{V_0}{t_r}. \tag{14}$$

Substituting equation (11) into equation (14), the rise-time for the switch drain-to-source potential is given as $$t_r \approx \frac{LC}{t_{on}} \left( \frac{V_o}{V_i} \right). \tag{15}$$

The discharge time in the cycle is defined as the time required for inductor $L_1$ to release its energy to the load. The length of time for this discharge is determined by the energy level in inductor $L_1$ and by the input and output voltages. This discharge occurs linearly starting from the peak value of the inductor $L_1$ current at turn-off to a zero current level at the end of the period. During this time period, both inductor $L_1$ and the input supply energy to the load.

During the discharge period, the voltage across inductor $L_1$ will equal the difference between the output and input voltage, and the drain-to-source potential rises to the full output voltage. Using the basic inductor voltage-current relationship, the discharge period is given by $$t_d = \frac{V_i t_{on}}{V_o - V_i} = \frac{LI_p}{V_o - V_i}. \tag{16}$$

The resonant ring-down portion of the cycle is critical in employing the zero-voltage switching technique. The resonant structure of the time period is a result of the circuit's parasitic capacitance, stray capacitance, and stray inductance throughout the circuit.

For the zero-voltage switching converter, the resonant ring-down period ends when the drain-to-source potential reaches zero. At this point, the body diode starts conduction and clamp the voltage near zero volts. The initial condition on the equivalent circuit capacitance of FIG. 2 is a charge of $V_o$ volts. The charge on the capacitor will act to supply the circuits inductance with current determined by $$V_L = L \frac{di_c}{dt}, \; i_c = C \frac{dv_c}{dt} \tag{17}$$

and
$$V_i = v_L + v_c \tag{18}$$

where C is the equivalent circuit capacitance. Combining equations (17) and (18) with the initial condition in a Laplacian form, the s-domain capacitor voltage becomes $$V(s) = V_o \frac{s}{s^2 + 1/LC} + V_i \frac{1/LC}{s(s^2 + 1/LC)}. \tag{19}$$

The capacitor voltage in the time domain is given by $$v_c(t) = (V_o - V_i) \cos\left(\frac{t}{\sqrt{LC}}\right) + V_i. \tag{20}$$

The inflection point of the capacitance voltage, as well as the mean value, is at the level of the input voltage.

The time at which the body diode starts to conduct is determined by setting $v_c$ equal to zero. This time is given by $$t_f = \sqrt{LC} \left[ \frac{\pi}{2} + \sin^{-1}\left(\frac{V_i}{V_o - V_i}\right)\right]. \tag{21}$$

The cosine function is replaced by the shifted sine function to ensure that future calculations requiring this value are returned in the proper quadrant.

The conduction period of the body diode is determined by allowing inductor $L_1$, which has been resonating with the circuit's equivalent capacitance through the input source, to release its energy after the voltage across the switch forward biases the body diode. The discharge of inductor $L_1$ during this step is linear with the same slope as the charge portion of the cycle.

The current level when the body diode becomes forward biased is obtained from differentiating equation (20), substituting the time that the conduction begins from equation (21) and multiplying the result by the effective circuit capacitance, yielding $$I = \sqrt{\frac{C}{L}} \; (V_o - V_i) \sin\left(\frac{\pi}{2} + \sin^{-1}\left(\frac{V_i}{V_o - V_i}\right)\right). \tag{22}$$

To determine the amount of time that it will take inductor $L_1$ to discharge, the basic inductor voltage-current relationship is used, $$V_i = L \frac{I_{bd}}{t_{bd}}, \tag{23}$$

where $I_{bd}$ is the magnitude of the body diode peak current level and $t_{bd}$ is the time required to discharge the stored energy. When the output voltage is less than twice the input voltage, then I is greater than zero and when the output voltage is greater than twice the input voltage, then I is less than zero.

Solving equation (23) for the body diode conduction time yields $$t_{bd} = \sqrt{LC} \; \frac{V_o - V_i}{V_i} \sin\left(\cos^{-1}\left(\frac{V_i}{V_o - V_i}\right)\right) \tag{24}$$

$$= \sqrt{LC} \; \sqrt{\left(\frac{V_o}{V_i}\right)^2 - \frac{2V_o}{V_i}}$$

The zero-voltage switching requirement of turning the switch on when the switch potential is at or near zero volts requires that PWM controller 60 turn the switch on during this period.

Power transfer from the input source to the load takes place during the discharge cycle of inductor $L_1$ through pass diode $D_1$. The energy that is supplied to the load is a combination of energy stored in inductor $L_1$ and the energy transferred from the input source in that time frame. The input power and the output power are equal in a lossless converter, $$P_i = P_o = \frac{E_L}{T} + \frac{1}{T} \int_0^{t_d} V_i I_p \left(1 - \frac{t}{t_d}\right) dt \tag{25}$$

$$= \frac{LI_p^2}{2T} + \frac{V_i I_p t_d}{2T}$$

where the discharge time is given by equation (16), which yields $$P_o = \frac{LI_p^2}{2T} \left[ \frac{V_o}{V_o - V_i} \right]. \tag{26}$$

Substituting the value for the peak current in inductor $L_1$, equation (11), the power transferred to the load is $$P_o = \frac{V_i^2 r_{on}^2}{2LT} \left[ \frac{V_o}{V_o - V_i} \right] \qquad (27)$$

where T is the total length of time for one complete cycle. This time is given by the sum of all conduction times in the circuit, $$T = t_{on} + \frac{LC}{t_{on}} \frac{V_o}{V_i} + \frac{V_i}{V_o - V_i} t_{on} + \qquad (28)$$

$$\sqrt{LC} \left[ \frac{\pi}{2} + \sin^{-1}\left(\frac{V_i}{V_o - V_i}\right) \right] +$$

$$\sqrt{LC} \sqrt{\left(\frac{V_o}{V_i}\right)^2 - \frac{2V_o}{V_i}}.$$

Using equations (27) and (28), one can obtain the required values for the inductance and circuit capacitance to obtain a power level at a desired output voltage and operating at a desired frequency.

The response to a change in output power requirement on the pulse width is determined to a first approximation by neglecting the terms in the total period that are of short duration The primary terms in the power transfer equation are the switch on-time and the inductor discharge time. Setting all other components of equation (28) to zero and substituting into equation (27), the output power is determined by $$P_o = \frac{V_i^2 t_{on}}{2L\left(1 + \frac{V_i}{V_o - V_i}\right)} \left[ \frac{V_o}{V_o - V_i} \right]. \qquad (29)$$

Differentiating the output power with respect to the time during which the switch is on yields $$\frac{dP_o}{dt_{on}} = \frac{V_i^2}{2L\left(1 + \frac{V_i}{V_o - V_i}\right)} \left[ \frac{V_o}{V_o - V_i} \right] \qquad (30)$$

which illustrates that changes in output power are directly proportional to changes in the pulse width of the converter.

Transient dissipation in the zero-voltage switched converter is limited to turn-off transients. Turn-off transients are a result of the channel voltage rising while current is flowing through the channel. Techniques have been developed for dissipating the turn-off energy in a PWM converter outside of the switch, such as turn-off snubbers, and are either dissipating or non-dissipating in their energy removal techniques.

The technique of transient dissipation suppression used by the converter circuit of FIG. 5 involves utilizing the added capacitance $C_{res}$, placed in the circuit to provide the required ring-down time, as a means of holding the drain-to-source potential at a low level while the channel clears of current The added capacitance $C_{res}$ serves to effectively bypass the current during the transitional period when the switch opens. The ability to measure the actual transient current through the channel is limited because the parasitic capacitance $C_{PAR}$ redirects the current flow from the channel during the transitional period.

The MOSFET's transconductance determines the rate at which the channel conduction varies when the gate signal is varied. In the switching mode of operation, the time required to close the channel is dependent upon the rate at which the gate-to-source capacitance of MOSFET $Q_1$ is discharged. During turn-off, the voltage rise across the channel takes a much longer period of time than the time for the current to drop through the channel. The dissipation that occurs during turn-off in the circuit during a complete switching cycle is given by $$P_{turn-off} = \frac{1}{T} \int_0^{t_o} I_p \left(1 - \frac{t}{t_o}\right)\left(\frac{V_o}{t_r} t\right) dt \qquad (31)$$

where $t_o$ is the time required to clear the channel and $t_r$ is the time required for the voltage to rise from zero to the output voltage level. At time $t_o$, the current through the channel is zero and the power loss due to the transient switching action is zero. Solving the above yields $$P_{turn-off} = \frac{I_p V_o t_o^2}{6 T t_r}. \qquad (32)$$

The effect of switching MOSFET $Q_1$ under a load is observed in the gate drive circuitry and in the added noise observed in the current and voltage waveforms.

MOSFET devices are used in switch mode circuits for their ability to switch very rapidly. MOSFET switching devices have been used as power switches for speeds up to 10 MHz. MOSFET $Q_1$ used in this embodiment and in most power converter applications is an N-channel enhancement mode transistor where the body and source form an anti-parallel body diode $D_B$ across the transistor. This anti-parallel diode is an integral part of the zero-voltage switched converter in that it holds the switch voltage near zero during the reverse conduction cycle of the MOSFET.

A MOSFET is a charge control device. The control voltage is applied to the gate of the device and induces an electric field across the dielectric barrier, usually $SiO_2$, and clears the channel to allow current to flow through the device. This insulated gate structure gives the MOSFET a very high input impedance. In the switching mode, the channel is cleared and the device acts as a series resistance to current flow. The drain-to-source resistance during the on-time, $R_{DS}$, is an important figure of merit for MOSFET's. Drain-to-source resistance is a disadvantage when compared to the bipolar transistor because conduction losses can account for a significant portion of switch losses at high current levels. Advantages of the MOSFET include a small current drive requirement, no second breakdown failure mode, and a stable switching time as temperature changes. In addition, since MOSFETs are majority carrier devices, they do not require the elaborate reverse current circuits that are required for turning off bipolar power transistors. Upon release of the gate drive potential, the device begins to turn off immediately.

Design considerations when using a MOSFET in a power switching circuit are twofold. First, the lengths of all leads going to the device must be minimized. This is especially true of the gate drive lead. Long leads in the gate drive circuitry will cause oscillations since the parasitic inductance and the MOSFET capacitance form a resonant network. If the leads are long, lossy ferrite beads or a small resistor in series with the drive can reduce oscillations. The second factor important in utilizing the MOSFET is the high input impedance of the MOSFET. This high input impedance requires that the driving source impedance be very small in order to prevent positive feedback in the drive circuit, which is a result of the Miller effect discharge of the drain-to-source and gate-to-drain capacitance into the drive circuit during turn-off thus leading to oscillations.

Figure 8:
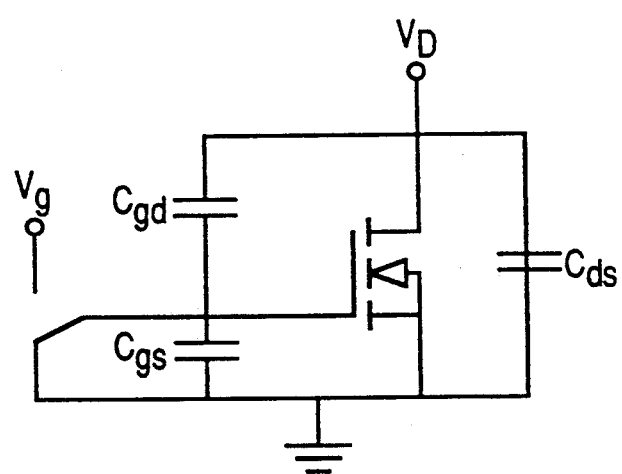
FIG. 8 shows a MOSFET capacitive model.

The Miller effect of the MOSFET is a result of the insulated gate structure of the device. This structure yields a relatively high value of capacitance between the gate-to-drain and the gate-to-source junctions. The MOSFET's inherent depletion capacitance between the drain and source combines with the other capacitances to become important relative to the characteristics of the switching MOSFET. A model of the MOSFET is given in FIG. 8.

If the MOSFET drain potential is a non-zero value, $V_D$, the drain-to-source, gate-to-drain, and gate-to-source capacitances are charged to $+V_D$, $+V_D$, and 0 volts respectively. When a gate drive is applied to the device, the potentials will change to 0, $-V_g$, and $V_g$ respectively. The net change in voltage across each of the capacitances is $-V_D$, $-(V_D+V_g)$, and $V_g$. In order to complete the switching action of the MOSFET, the gate drive circuitry must supply the current required to charge both gate-to-drain and gate-to-source capacitances. The requirement of the gate drive circuitry to supply the additional charging current to charge the gate-to-drain capacitance is similar to the Miller effect seen in amplifier circuits. This effect is greater for large signal analysis than for small signal analysis in typical amplifier circuits.

When the switch is at a zero potential across the drain-to-source junction and there is not gate drive present, as is the case in the zero-voltage switched converter of FIG. 5, the capacitances between the gate-to-drain, gate-to-source and the drain-to-source are charged to zero volts. When the gate signal is applied, the gate-to-source capacitance must charge to the level of the gate drive potential. Since the drain potential is zero when the switch is turned on, there is no need to charge the gate-to-drain capacitance. In practice, a small coupling will exist between the gate-to-drain and the drain-to-source capacitance in the MOSFET causing a negligible change in the gate drive voltage.

The requirements of a zero-voltage switched converter dictate that the converter must operate in a discontinuous mode. The first parameters chosen in the design are the desired output power and the desired operating frequency. The specific converter of FIG. 5 was chosen to transfer 10 watts at a maximum pulse width of 10 μs. These parameters set the maximum possible operating frequency of the converter to be less then 100 kHz, as determined by the limited capabilities of the controller to vary its frequency. It is clear that converters having other parameters can be designed without departing from the scope of the invention.

Requirements of the controller of FIG. 5 for zero-voltage switching are that the sum of the on-time and the discharge time be between 10 and 20 μs, and the maximum on-time be limited to 9μs. With a voltage conversion ratio of 2.8 for 34 volts boosted to 94.7 volts and a 1000 Ω load, a discharge time of 5 μs is obtained.

The total period of the circuit cannot be obtained directly since the frequency varies as the pulse width changes. As such, an approximate period must be assumed for operation that is in excess of the sum of the switch on-time and the inductor discharge time. The total period is given in equation (28), and is used for iterating the results obtained from the chosen inductor size. Knowledge of the requirements of the controller in responding to reset cycles and parasitic capacitances is also important in choosing the inductance $L_1$ value and added capacitance $C_{res}$.

As an initial period estimate, the sum of the on-time, discharge time and delay time is used to obtain an estimate for the required inductor size. When the initial estimate of the total period is set at 15 μs, an inductance from equation (7) of 538 μH is yielded. To accommodate for a lower range of input voltages, a smaller value of inductance is used in the converter of FIG. 5. The desired inductor $L_1$ size is set at 450 μH.

Pass diode $D_1$ in the embodiment of FIG. 5 is a Motorola MUR 410, a large junction area device. The MUR has a peak repetitive reverse voltage of 100 volts and a maximum current carrying capability of 4 amps at 80° C. The forward voltage characteristics are 0.725 volts at the converter's peak current of 0.6 amps at 25° C. The forward recovery time of the diode is 25 ns. Maximum reverse current at 25° C. is 5 μA. The average power dissipation for the designed operating current of the converter is approximately 0.25 watts. The capacitance of the pass diode $D_1$ decreases exponentially with reverse voltage. For a reverse voltage of two volts, the capacitance is approximately 125 pF and drops to an asymptotic value of approximately 35 pF at 50 reverse volts.

MOSFET $Q_1$ used in this embodiment is a Phillips BUZ 60 power MOSFET. The device characteristics are a maximum voltage rating of 400 volts and a drain-to-source resistance in the on-state of less than one ohm. The maximum drain current of the device is 5.5 amps and the maximum power is 75 watts. Typical transconductance is 2.5 amps per volt and the typical drain-to-source capacitance is 30 pF.

Filter capacitors $C_{in}$ and $C_{out}$ across the input and output terminals respectively are chosen to maintain a reasonably constant input and output voltage. The value of filter capacitance required is based on the amount of ripple desired in the output. The zero-voltage design operates in a discontinuous mode and the output capacitor is expected to supply the load for the entire time that the switch is on in addition to the dead time. This maximum time is approximately 15 μs. The equation to determine the required capacitor size is $$C_{out} = I \frac{\Delta T}{\Delta V} \qquad (33)$$

where $\Delta T$ is the time required for capacitor $C_{out}$ to supply the load and $\Delta V$ is the desired output ripple. For the 1000 Ω load and an output voltage of approximately 95 volts, the required capacitance for a 25 mV ripple is 57 μF. The design value used in the circuit of FIG. 5 is 60 μF. Since the input terminals of the converter are connected to a regulated dc power supply, and the output capacitance of the source is relatively large, the value of the input capacitance is chosen to be 30 μF.

This ensures constant input voltage source for the converter.

Sense resistors $R_1$ and $R_2$ are used in the converter of FIG. 5 to obtain a voltage regulating control signal for the controller. The desired output voltage is determined by operating the converter in the constant pulse-width, variable-frequency mode to determine the parameters for zero-voltage switching. A resistor network of a 91 k$\mu$ resistor and a 5.1 k$\mu$ resistor for $R_1$ and $R_2$ respectively is used. Output line A is connected between resistors $R_1$ and $R_2$.

The capacitance placed across MOSFET $Q_1$, $C_{res}$, ensures proper timing during the resonant ring-down period. Its value may be experimentally determined, and it is physically connected directly to the drain and source of MOSFET $Q_1$ to provide a high current path and to minimize the parasitic inductance formed in the wire leads.

Figure 9:
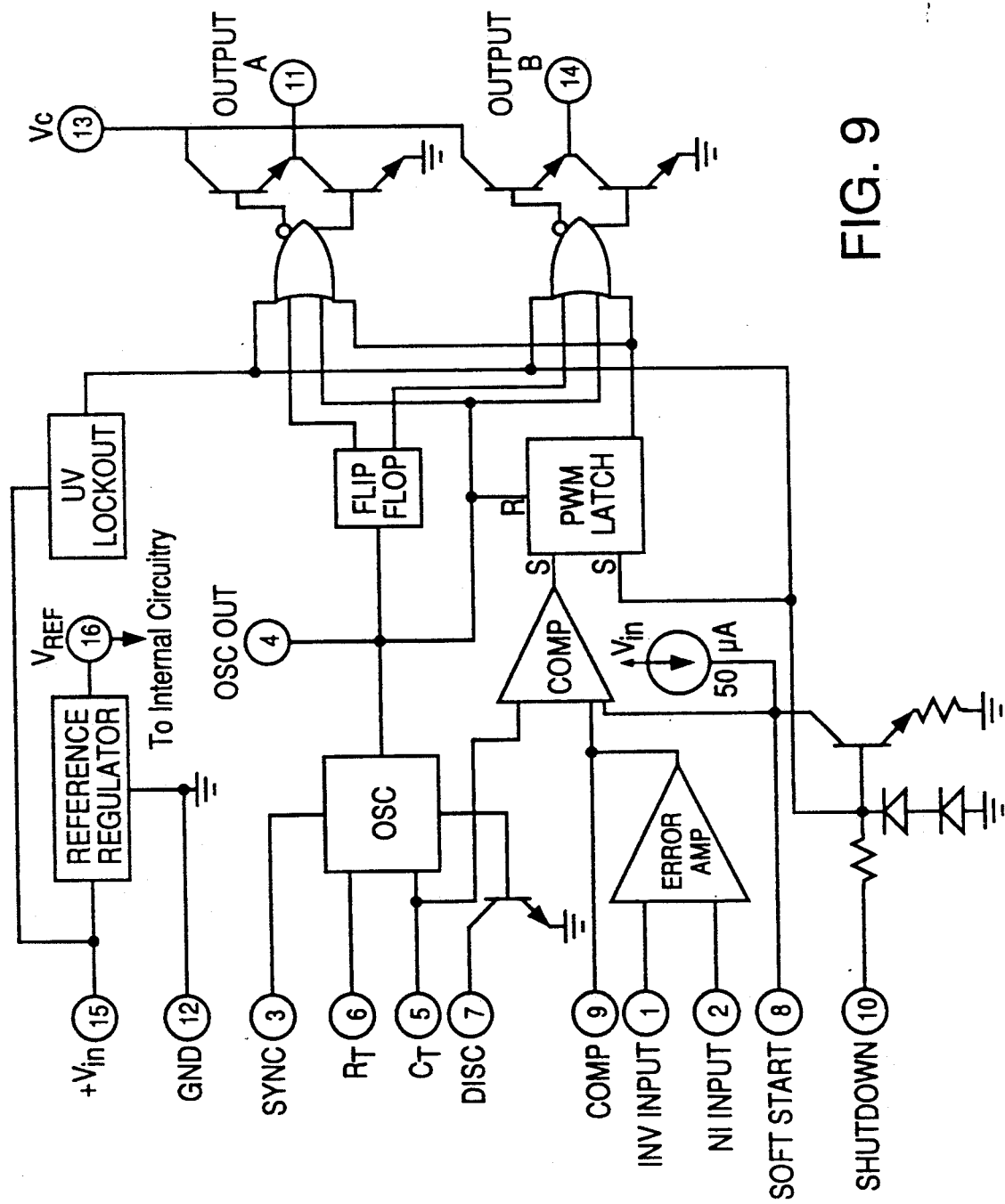
FIG. 9 shows a block diagram of the controller.

Controller 60 used in the embodiment of FIG. 5 is a Texas Instruments SG3525 PWM voltage-controlled controller. Experimental testing indicates a delay of approximately 1$\mu$s after the reset is sent until the gate drive circuit is activated. This controller was chosen for its ability to be synchronized to an external clock. It is a dual output device, but only a single output is used for timing considerations. FIG. 9 shows a block diagram of the controller.

Timing for controller 60 is critical. The typical operation of the SG3525 controller allows for the synchronization of the gate pulse to occur within 10% of the end of the cycle. In order to maintain a wide range of available frequencies of operation, the timing pulse must be able to occur at any reasonable time. For this reason, the device is operated in a quasi-single ended mode. This mode is accomplished by using one of the available outputs as the driver instead of connecting the two outputs together to operate in a single ended mode. The mode was chosen to allow the discharge period to end within the timing interval of the unused output. When the reset signal is received on the unused portion of the output cycle, controller 60 ends the conduction period and starts the output cycle used in the converter. When this is accomplished, the available frequency range in the circuit is approximately from a maximum of the single ended frequency down to the single ended period plus the required discharge time.

Another difficulty in the timing of controller 60 is the delay between the time the synchronization pulse arrives and the time controller 60 reinitiates the gate drive pulse. The delay is due to a minimum voltage level required in the controller's timing circuitry before the pulse is initiated. This time delay is the driving factor in choosing the required size of the added drain-to-source capacitance $C_{res}$. The resonant ring-down period must be delayed long enough to allow controller 60 to respond to the reset pulse while the voltage across the switch is still at zero. If the value of added capacitance $C_{RES}$ is too small, then the resonant period is too short and the voltage will start to rise before controller 60 can drive the switch into conduction.

The timing in controller 60 is set by a resistor-capacitor network $R_{11}$ and $C_1$ connected from pins 6 and 5 to ground, respectively. A dead time resistor $R_{10}$ is placed between pins 7 and 5 to allow for discharge of the timing capacitor after the maximum voltage level in the timing circuitry has been attained. The general timing equation for controller 60 is approximately $$f = \frac{1}{C_T(0.7R_T + 3R_{10})}. \tag{34}$$

The value for $R_{10}$ is selected at 10 $\Omega$ in this embodiment to limit the noise without affecting the circuit timing. A timing resistance $R_{11}$ of 3.9 k$\Omega$ and a capacitance $C_1$ of 0.005 $\mu$F are further selected to set the frequency of operation at 72.5 kHz.

Controller 60 has the ability to drive the gate directly without additional drive circuitry. This allows for fewer components in the gate drive circuitry, although separate drive circuitry could be used to drive the gate into saturation faster, thus speeding up the turn-on and turn-off transient periods.

Feedback in a boost circuit is required in the controller due to an inherent time delay in the operation of the converter. This time delay is created because the actual transfer of energy through the converter takes place during the period when the switch is open instead of when it is closed. This requires that the controller be operating on an average sense value following an instantaneous value to allow for proper pulse width determination of the converter. Feedback is accomplished using a dual feedback system of a lowpass RC network consisting of resistor $R_{12}$ and capacitor $C_8$ to the inverting terminal and a capacitor $C_3$ from the output of the error amplifier to ground. This stabilizes the system and allows for a regulated output with varying loads and input voltages within the constraint of the operating frequencies of the controller. Capacitor $C_3$ to ground tends to short the high frequency switching noise effects of the converter to ground, thus stabilizing the converter from switching noise transients. The RF filter (resistor $R_{12}$ and capacitor $C_8$) in the feedback loop acts as an integrator and slows the system response to the output of the error amplifier. This feedback tends to reduce the frequency response of the converter to approximately two decades below the switching frequency.

The feedback values chosen in this embodiment consist of a feedback resistor of 100 k$\Omega$ in series with a capacitance of 0.68 $\mu$F and a capacitance of 0.02 $\mu$F to ground, which successfully stabilizes the system for switching noise as well as for load and input variations.

Inductor $L_1$ used in the converter is a single toroidal inductor manufactured by Amidon Associates of North Hollywood, California. The core is designated as T3-130 and is used for inductors that operate up to 600 kHz with an $A_L$ value for the core of 350 $\mu$H/100 turns. The following equation is used to obtain the number of turns required for inductor $L_1$, $$\text{Turns} = 100\sqrt{\frac{\text{desired } L\ (\mu H)}{A_L\ (\mu H/100\ \text{turns})}} \tag{35}$$

For a desired circuit inductance of 450 $\mu$H, inductor $L_1$ is wound with 114 turns of magnetic wire.

As explained earlier, a technique for sensing the drain potential is required to switch the MOSFET near zero volts The controller's response, however, is slow due to its internal design. Thus, the signal for resetting controller 60 must be sent prior to the drain potential reaching zero. In this embodiment, the reset signal is provided as a function of the changing inductor voltage. It should be noted that other techniques, such as providing a reset signal as a function of the voltage at the drain could be used.

An additional 10 turn inductor winding $L_{sense}$ is placed on the core of inductor $L_1$ with additional wire creating a small step down transformer for use as a voltage sense for inductor $L_1$. One lead of this winding is connected to system ground and the other lead is used to determine when the core has an inflection point in voltage for use in the zero crossing detector circuitry. The polarity of the transformer is arranged such that the discharge period produces the positive excursion of the voltage waveform and the charge period produces the negative excursion in the voltage waveform.

The time when the reset signal is sent to reset the controller is approximately when the inflection point occurs for the inductor voltage during the resonant ring-down period This inflection occurs when the voltage across the switch equals the input voltage level. This voltage level is halfway between the peak value and the minimum value of voltage seen by the switch if the body diode does not conduct. With the given value for the additional circuit capacitance $C_{res}$, this inflection occurs approximately 500 ns after inductor $L_1$ discharges and the pass diode $D_1$ turns off.

The base of a high speed switching transistor $Q_2$ is connected to one end of inductor $L_{sense}$. When the zero crossing occurs in the secondary of the transformer, the transistor will saturate, sending a five volt signal to NAND gate $Q_4$. The base is connected to ground via a diode $D_2$ to prevent the possibility of the transistor's base-emitter junction from going into zener breakdown during reverse bias periods.

A pulse for the controller 60 is generated when transistor $Q_2$ is saturated and the gate drive voltage is not present. AND gate $Q_4$ prevents a pulse from occurring when the gate drive is present, and thus prevents the disrupting controller 60. The logic for the reset trigger pulse is $$\text{trigger} = Q\overline{\text{drive}} \qquad (36)$$

where Q is the output of the transistor and drive is the gate drive voltage.

The layout of the power converter circuit is also important The high current paths and critical timing elements must be identified and an effort must be made to reduce the length of the leads going to these elements. Any excess lead lengths result in parasitic inductance and thus cause ringing in the circuit when switching action occurs.

The common ground point of the circuit for all elements connected to ground is at the source of MOSFET $Q_1$. This prevents the presence of ground loops, and thus prevents instability in the control loop. In addition, the wires of the sense resistor must be intertwined to ensure that a loop is not available for inductive pick up of the generated transient noise in the circuit.

The capacitance $C_{res}$ added to the circuit to ensure proper timing must be connected as close as possible to the drain and source with very short leads. This prevents the inductive nature of the capacitor from resonating during the switching periods and provides a high current path around MOSFET $Q_1$ during turn-off.

The noise reduction techniques included in the controller circuitry are a capacitive network on the power supply and a small resistance between the chip power and the output drive power. The values for capacitive filtering are a large 6.8 $\mu$F tantalum capacitor $C_7$ in parallel with a small 0.68 $\mu$F ceramic capacitor $C_6$ connected from the point of entry of power into controller 60 at pin 15 to ground at pin 12. This results in a large reduction in the amount of switching noise present in the circuitry. A 2.7 $\Omega$ resistor $R_9$ is placed between the controller power on pin 15 and the output drive power on pin 13 to limit the amount of switching noise being reintroduced into the system. These noise reduction techniques are often vital to the proper operation of high-gain high-frequency controllers.

A zero-voltage switched variable-frequency PWM converter according to the invention was designed and tested. The device operated at a nominal 67 kHz and 8 $\mu$s pulse width for a regulated conversion of 35 volts to 194.7 volts delivering 8.87 watts operating at 93.5% efficiency. As input voltage varied between 33.5 and 41.8 volts, the frequency range was from 60 kHz to 80 kHz with pulse widths ranging from 10 $\mu$s to 6 $\mu$s. The converter was first designed and tested in a constant pulse-width variable-frequency mode to determine the required timing for the circuit. By operating in this mode, it was possible to determine the proper voltage conversation ratio range for the zero-voltage switched mode. The device was operated with a pulse width of 8 $\mu$s and the frequency was varied in an open loop configuration to obtain the zero voltage condition. The output voltage obtained when operating in this condition with a 35 volt input was 95 volts with a 1000 $\Omega$ load.

After the parameters of the circuit were measured, the frequency controller was replaced by a PWM controller operating with a maximum pulse width of 10 $\mu$s. The feedback loop was closed and an output voltage of 94.7 volts was obtained while operating in a zero-voltage switched mode.

Various circuit parameters for an input voltage of 37 volts boosted to 94.7 volts were measured and are listed below:

$t_{on} = 7.4$ $\mu$s,
$t_r = 0.1$ $\mu$s,
$t_d = 4.8$ $\mu$s,
$t_f = 1.2$ $\mu$s,
$t_{bd} = 0.5$ $\mu$s,
$I_{bd} = 0.6$ amps,
$T = 14$ $\mu$s.

The average input current was 256 mA at 37 volts and the output values were 93.7 mA at 94.7 volts. The output power was 8.87 watts with an input power of 9.47 watts resulting in circuit losses of 0.6 watts. These losses are diode losses, inductor losses, MOSFET conduction losses, transient switching losses, capacitor leakage and sensing circuit losses. Accountable losses are 0.25 watts in pass diode $D_1$ and 93 mW in sense resistors $R_1$ and $R_2$. The conduction losses are approximated from the 1 $\Omega$ resistance of MOSFET $Q_1$ and the rms current through the device. The conduction losses are calculated using the equation $$P_{cond} = \frac{1}{T} \int_0^{t_{on}} R_{ds-on} i^2(t) dt. \qquad (37)$$

The instantaneous current is a linear function starting at zero amps and rising to a peak value of 0.6 amps at the end of time $t_{on}$, 7.4 $\mu$s. The losses experienced in the channel during conduction 63.4 mW. The sense circuit voltage levels range from 5.1 volts during discharge to $-3$ volts during inductor $L_1$ charge. This average voltage in the inductor voltage sensing circuit, 4 volts, is dissipated across 1 kΩ resistor $R_4$ resulting in a dissipation of approximately 16 mW. This leaves approximately 178 mW of other losses.

Assuming the circuit inductance is equal to the inductance of the main inductor $L_1$ used in the circuit, the parasitic and added circuit capacitance is obtained from the ring-down period of 1.2 μs. The resulting value can then be used to validate the derived equations. Using equation (21) with the input and output voltages obtained, the value for the total average circuit capacitance is 600 pF. Of this value, 390 pF was added by capacitor $C_{res}$ to obtain the required timing for controller 60. This yields an average parasitic capacitance for the circuit of 210 pF.

Using the value for total average circuit capacitance, the times for other portions of the circuit are calculated and checked against observed values. The rise time for the circuit is given by equation (15). The calculated value for rise time is 0.1 μ which is consistent with the observed value. The discharge time is obtained from equation (16). For a peak current of 0.6 amps, the calculated discharge time is 4.8 μs. Equation (24) is used for determining the body diode conduction time. When calculated using the total average capacitance value, a conduction time of 0.63 μs is obtained compared to the measured 0.5 μs. The disparity between the calculated and observed value are due to the losses during ring-down, which reduce the peak current through inductor $L_1$ when the body diode starts conducting, as well as the effect of varying capacitance in pass diode $D_1$ and MOSFET $Q_1$ as the circuit potentials change.

Figure 10:
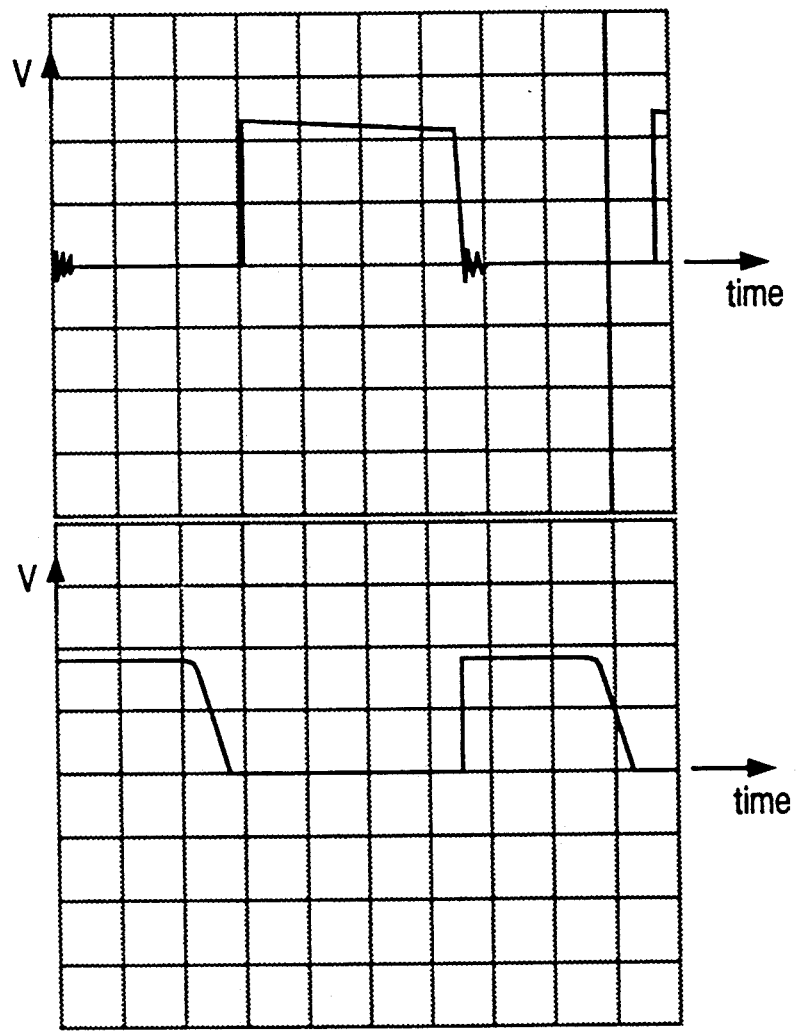
FIG. 10 shows the gate drive and drain voltage versus time.

The upper waveform of FIG. 10 is the gate drive pulse at 5 volts per division and the bottom trace is the drain voltage at 50 volts per division and 2 μs per division. The ringing evident in the gate drive pulse following both the rising edge and the falling edge is due to the excess gate drive lead lengths used to accommodate the insertion of a current probe. The extra inductance of the lead in combination with the gate capacitance is sufficient to cause oscillations in the gate drive, and could possibly lead to instabilities in switching. Of particular note in the gate drive waveform is the lack of ringing at the top of the pulse since a minimal amount of energy is required to turn MOSFET $Q_1$ on due to the zero-voltage switching technique. The resonant ring-down cycle of the drain voltage is evident with the clamping effect near zero volts. The gate drive is applied when the voltage at the drain is at the minimum value and hence does not allow for the voltage to ring back up towards the output voltage level as illustrated in FIG. 3.

Figure 11:
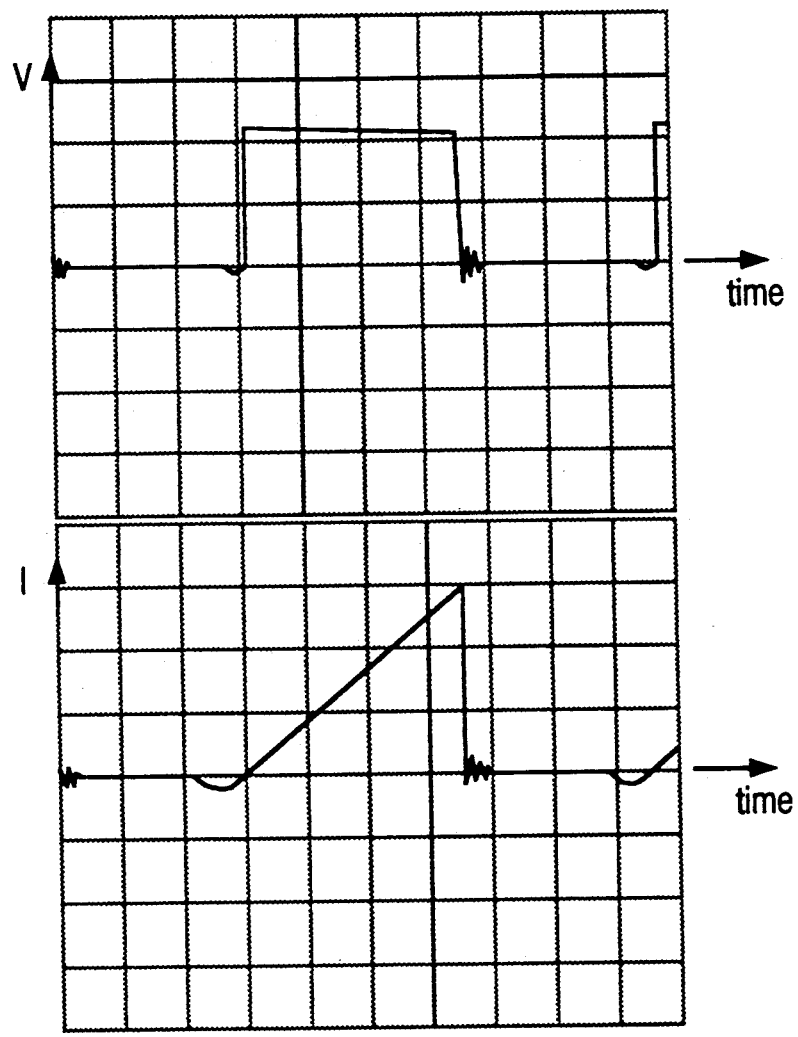
FIG. 11 shows the gate drive and switch current versus time.

FIG. 11 shows the gate drive at 5 volts per division and the sum of the current through MOSFET $Q_1$ and added capacitance $C_{res}$ at 0.2 amps per division and 2 μs per division. The beginning portion of the current trace illustrates the period when the switch is not conducting. A resonant current sinusoidal is visible after inductor $L_1$ has been depleted of energy. At this time, the energy stored in the capacitances $C_{res}$ and $C_{PAR}$ is transferred back to inductor $L_1$ and the source. The minimum in the current waveform is the point of inflection in the drain-to-source voltage The resonant cycle continues until the voltage across the capacitances $C_{res}$ and $C_{PAR}$ forward biases the body diode, at which point the voltage is clamped and inductor $L_1$ continues discharging into the source. The discharge at this point is linear and continues until the energy has been transferred into the source.

The switch is turned on when the drain voltage is zero and the body diode is still conducting. In the case of this converter, the turn-on occurs when the current has just been depleted in inductor $L_1$. A continual linear slope is maintained throughout the cycle from the commencement of the body diode conduction region to the peak current at the end of the on-time of the switch at a peak value of approximately 0.6 amps. The turn-off transient noise is visible as the current through the switch falls to zero. This is a result of the high capacitance value of the pass diode $D_1$ resonating with the MOSFET capacitance and inductance.

An important point to note in determining the pulse width of the converter is that the gate drive can occur at any time that the body diode is conducting. A dead time in the converter is created when inductor $L_1$ is discharging through the body diode of MOSFET $Q_1$. Inductor $L_1$ is discharging linearly through the body diode and discharges at a rate that is determined by the size of inductor $L_1$. Therefore, the gate drive can occur at any time during the body diode conduction time, but the actual effective pulse width does not commence until after inductor $L_1$ has completely discharged into the source.

Figure 12:
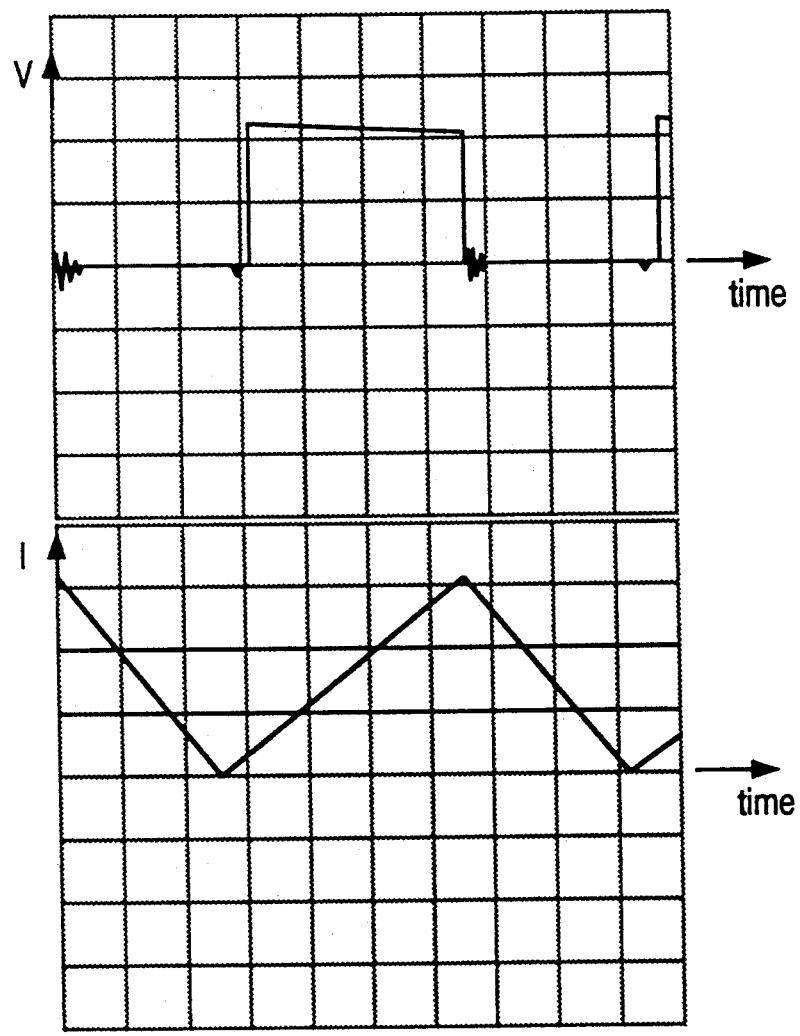
FIG. 12 shows the gate drive and inductor current versus time.

FIG. 12 shows waveforms of the gate drive and the inductor $L_1$ current. This figure illustrates the linear charge and discharge cycles of inductor $L_1$ and the dip in the negative current direction during the period of time when inductor $L_1$ and capacitor $C_{res}$ are resonating through the time of body diode conduction. The turn-on transition in inductor $L_1$ occurs as the current flow is about to reverse direction causing the voltage at the drain to rise.

Figure 13:
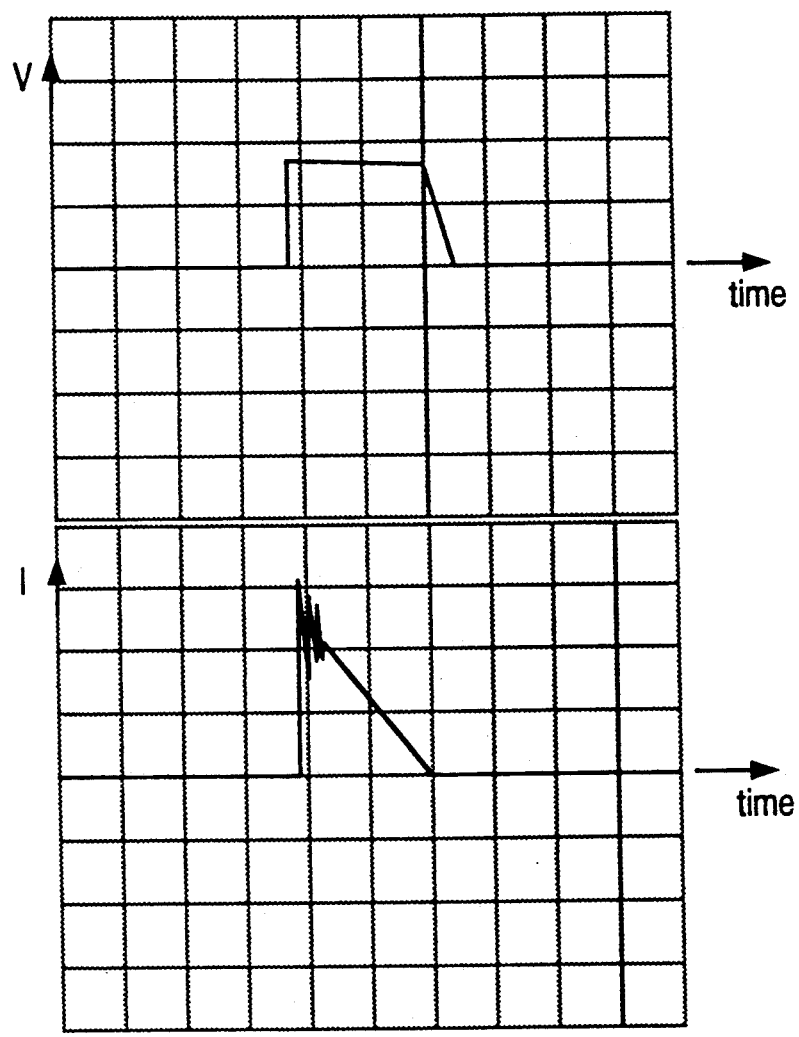
FIG. 13 shows the drain voltage and diode current versus time.
Figure 14:
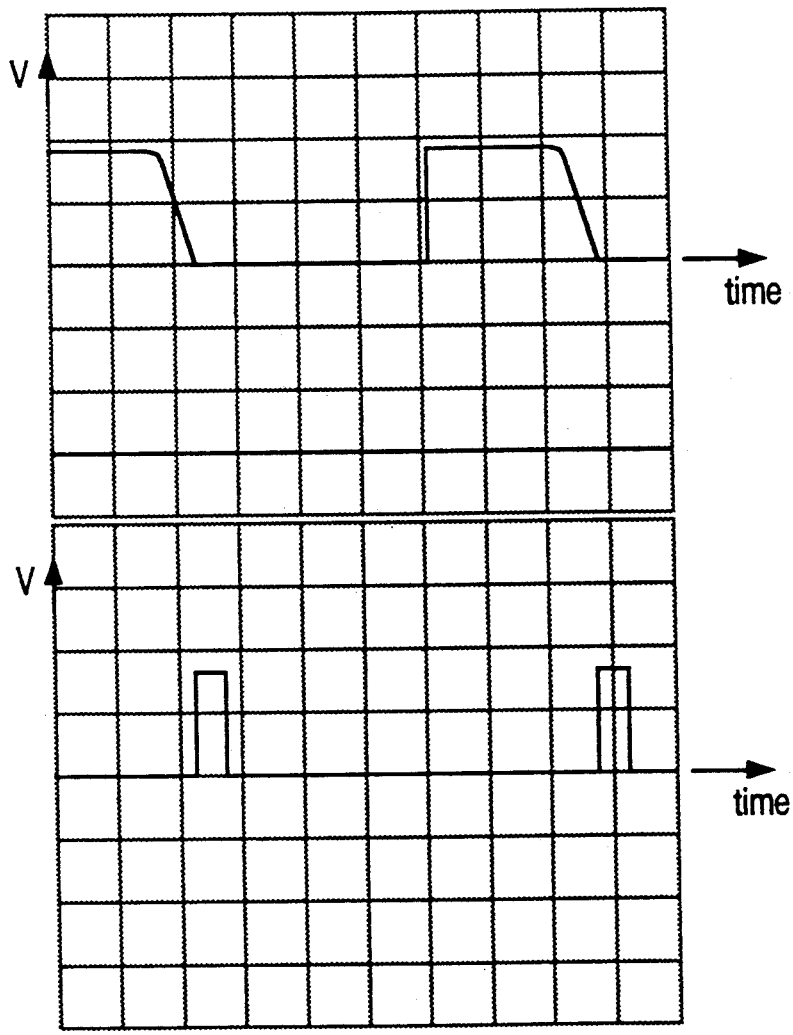
FIG. 14 shows the reset pulse and switch voltage waveform versus time.

FIG. 13 shows waveforms of the drain potential and the output current to filter capacitor $C_{out}$. As the switch is opened, the voltage at the drain rises and diode $D_1$ starts to conduct. The noisy conduction beginning is illustrated in FIG. 11 where the drain current oscillates at turn-off. The parasitic inductance in the long leads and device parasitic capacitance are responsible for the resonating action during the transition periods. The drain voltage waveform is shown with 50 volts per division and the diode $D_1$ current is shown with 0.2 amps per division. The timing axis shown is 2 μs per division FIG. 14 shows waveforms of the drain voltage and the reset pulse. The reset pulse ends when the gate drive begins. Scaling is 2 volts per division for the reset pulse and 50 volts per division for the switch voltage waveform at 2 μs per horizontal division. The width of the reset pulse is the delay in the controller from the beginning of the reset pulse to the application of the gate drive.

Figure 15:
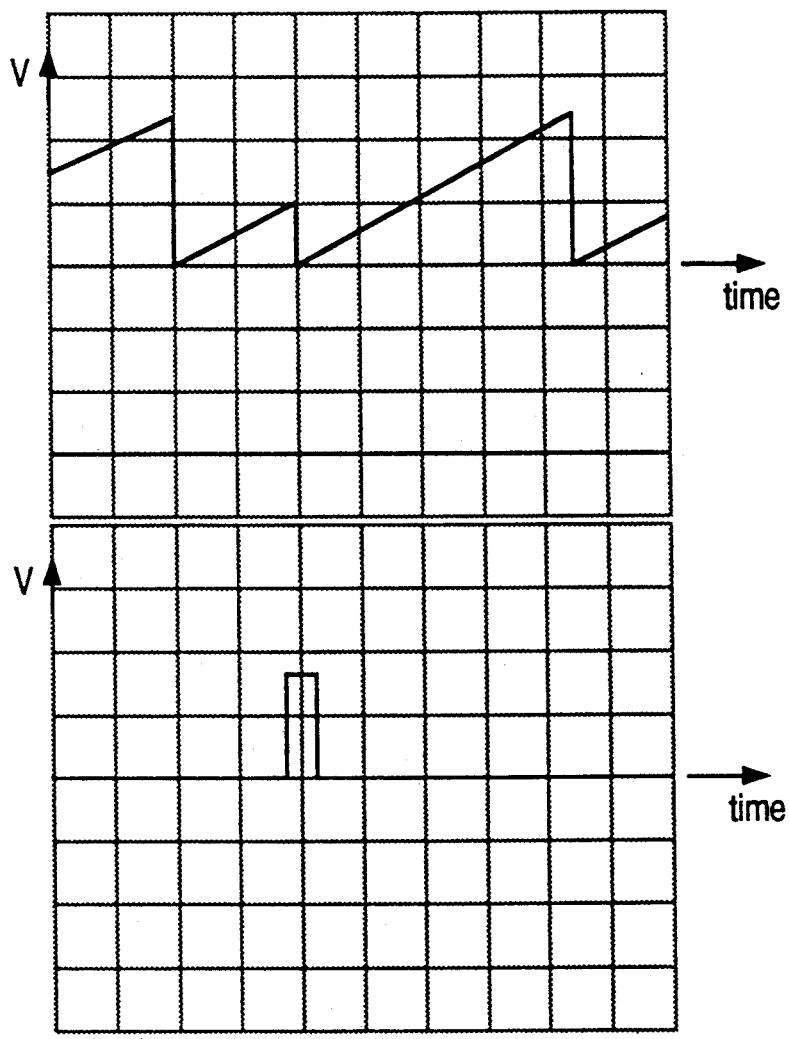
FIG. 15 shows the reset pulse and timing waveform versus time.

FIG. 15 shows waveforms of the reset pulse and the timing waveform of controller 60. Timing voltage is shown at 1 volt per division and the reset pulse is shown at 2 volts per division at 2 μs per horizontal division. The full sawtooth waveform is the portion of the controller operation that is used in driving the power MOSFET. The incomplete sawtooth is the portion of the cycle that is interrupted by the reset pulse for the zero-voltage implementation of frequency variation.

Figure 16:
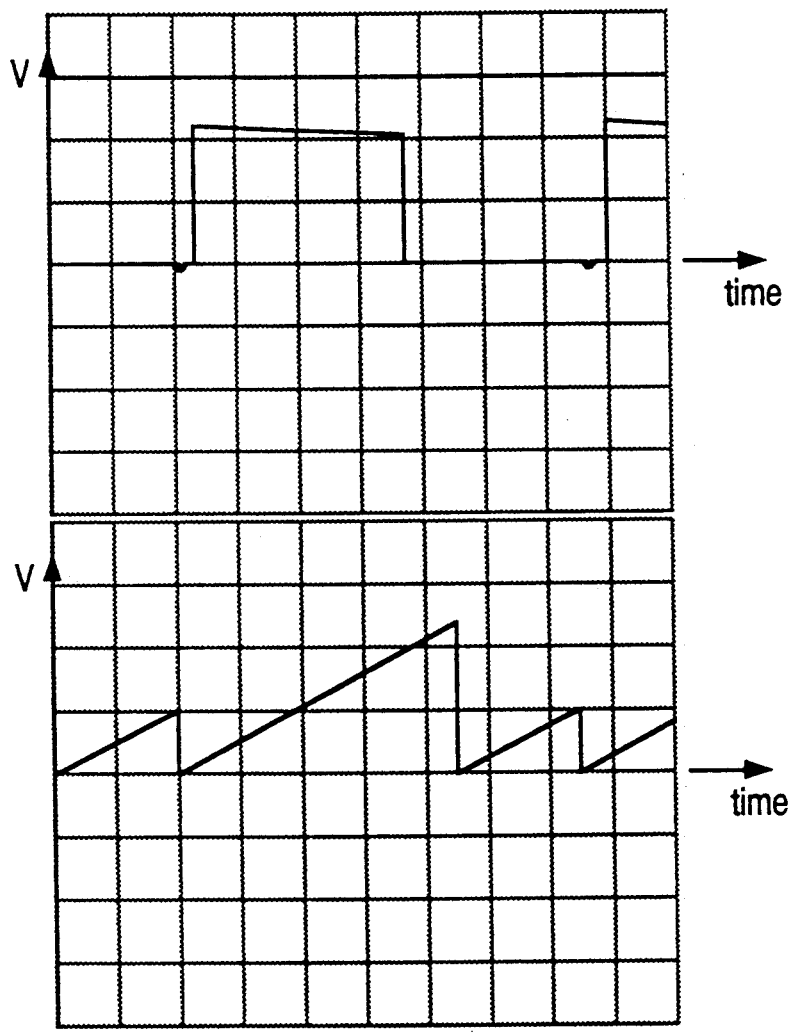
FIG. 16 shows the gate drive and timing waveform versus time.

FIG. 16 shows waveforms of the timing pattern and the gate drive illustrating the relationship between the gate drive and the controller timing. Scaling is 5 volts per division for the gate drive and 1 volt per division for the timing waveform at 2 μs per horizontal division. The delay between the end of the short ramp and the beginning of the gate drive requires that the reset pulse be sent prior to the actual zero crossing of the drain potential.

Figure 17:
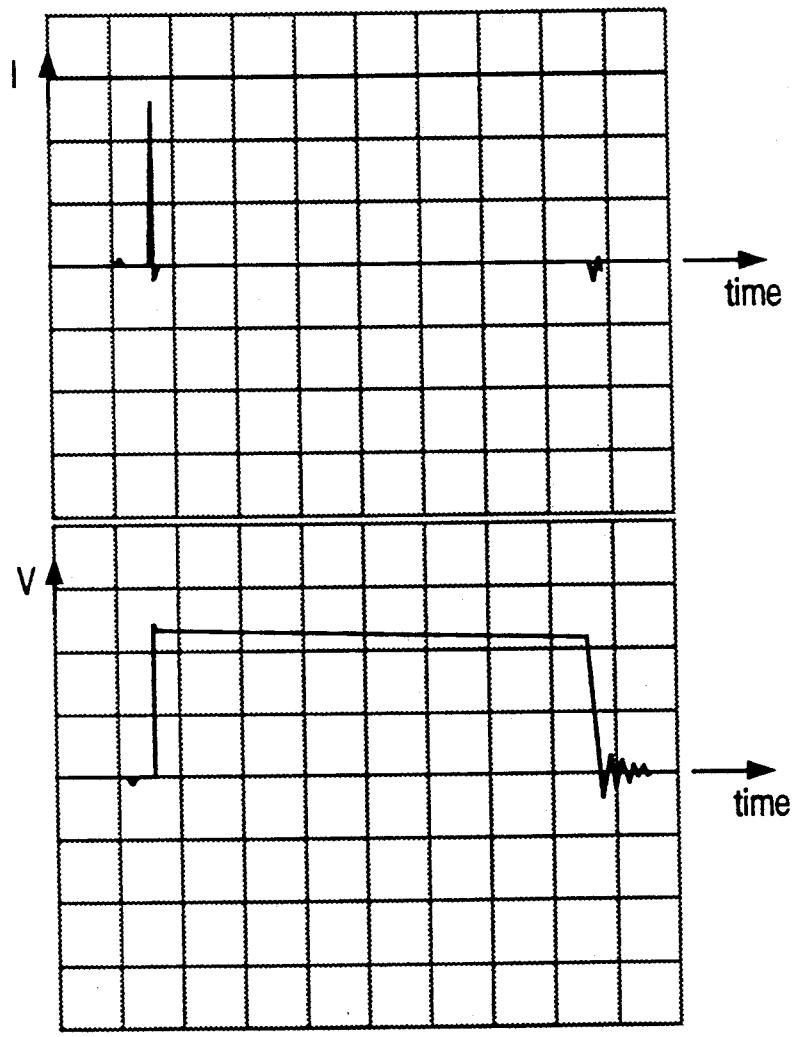
FIG. 17 shows the gate drive voltage and drive current versus time.

FIG. 17 illustrates the charge removal during turn-on and turn-off of MOSFET $Q_1$ by the controller. The lower waveform is the gate drive voltage and the upper waveform is the gate drive current. Scaling is 5 volts per division and 0.2 amps per division at 1 $\mu$s per horizontal division. The turn-on pulse is free of oscillatory noise since it is switched when there is no charge stored in the capacitance of MOSFET $Q_1$. The turn-off pulse, however, has noise since MOSFET $Q_1$ is turned off under load.

The variable-frequency pulse-width-modulated boost converter of FIG. 5 allows for operation at very high frequencies with minimal transient turn-on loss. The technique utilizes a frequency control scheme wherein the controller causes the switch to close when the voltage at the drain of MOSFET $Q_1$ is near zero volts. In addition to reducing transient turn-on losses, zero-voltage switching reduces noise generation in the circuit and simplifies the gate drive requirements.

Other characteristics of optimal switch utilization are met in addition to turning the switch on under a zero drain-to-source potential. The maximum peak voltage across the switch is limited to the output voltage level, and the peak and average currents through the switch are proportional to output power requirements.

Figure 18:
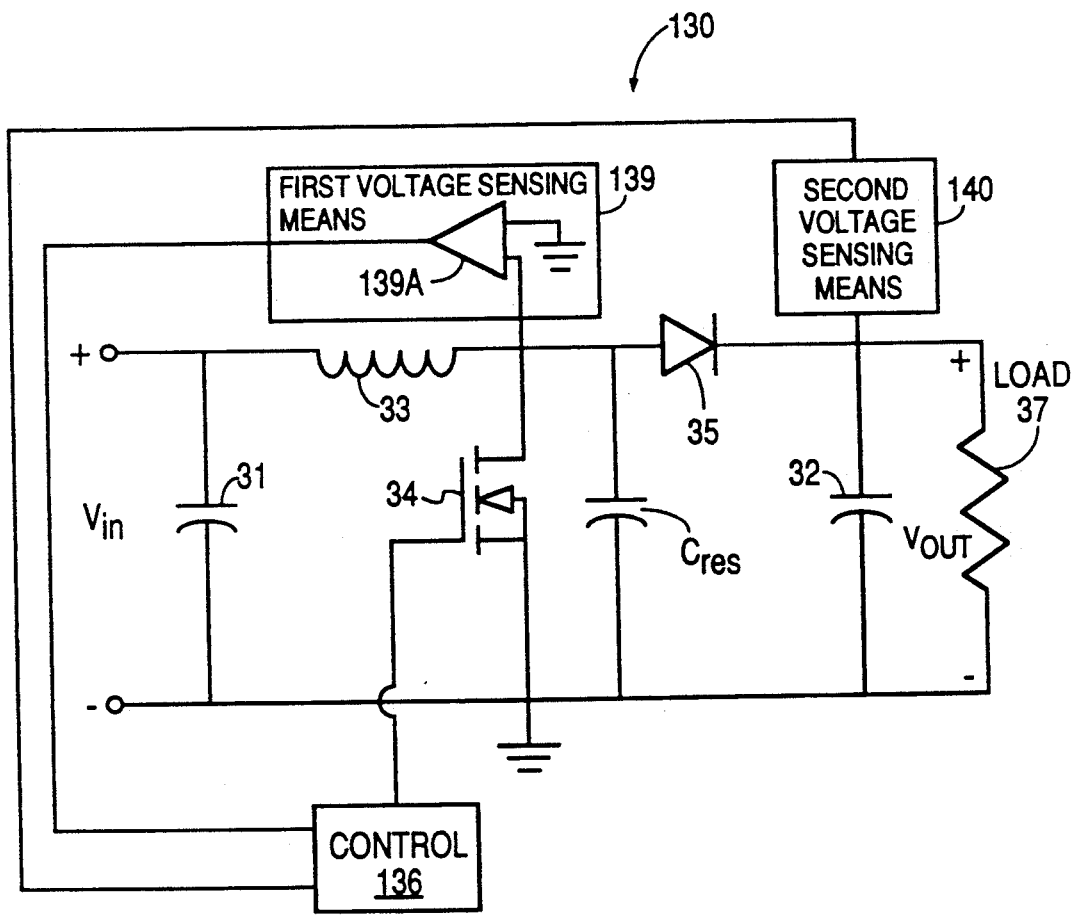
FIG. 18 shows a block diagram of a boost converter according to a second embodiment of the invention.

The zero voltage switching technique according to the invention may be implemented in other ways. FIG. 18 shows a block diagram of a zero voltage switched converter 130 having a first voltage sensing means 139 and a second voltage sensing means 140. The first voltage sensing means 139 includes a voltage comparator circuit 139A for comparing a voltage of the transistor 34 to a reference voltage. Other elements of converter 130 are numbered as in converter 30 of FIG. 4.

If a control 136 of converter 130 has a significant time delay similar to the reset time delay inherent in controllers 36 and 60 of FIGS. 4 and 5, then first voltage sensing means 139 is configured to provide a reset signal to control 136 when the ringing voltage level falls to a voltage equal to the input voltage. As such, MOSFET 34 is turned on following the delay when the ringing voltage reaches zero.

For a more ideal situation, however, control 136 is characterized with a very small time delay between receiving a reset signal and generating the gate drive pulse. In this embodiment, first voltage sensing means 139 is configured to provide a reset signal to control 136 when the ringing voltage reaches zero. When the reset pulse is received by control 136, a gate pulse is generated with little delay, and MOSFET 34 turns on with approximately zero voltage across it.

Figure 19:
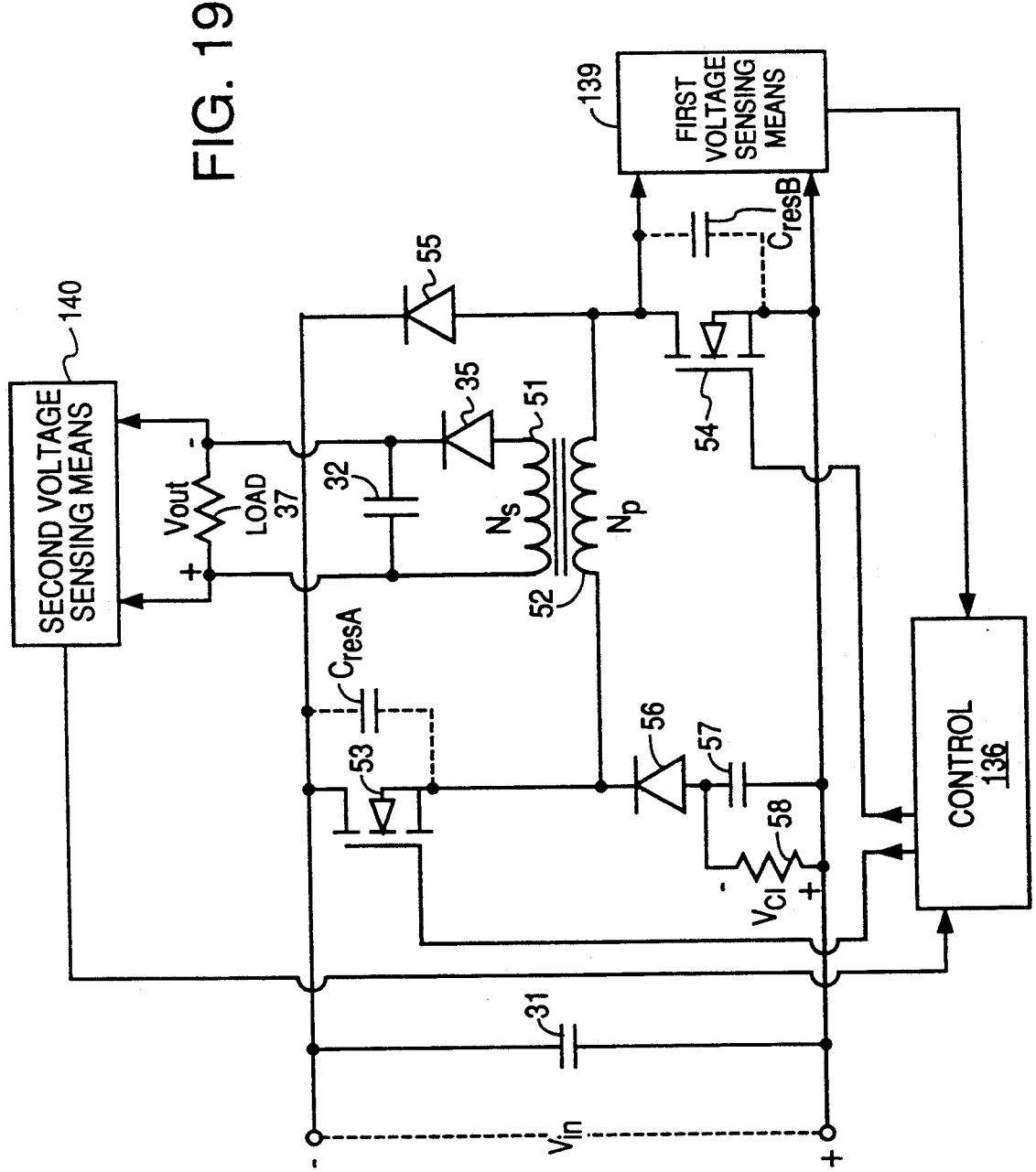
FIG. 19 shows a schematic of an isolated converter according to a third embodiment of the invention.
Figure 19A:
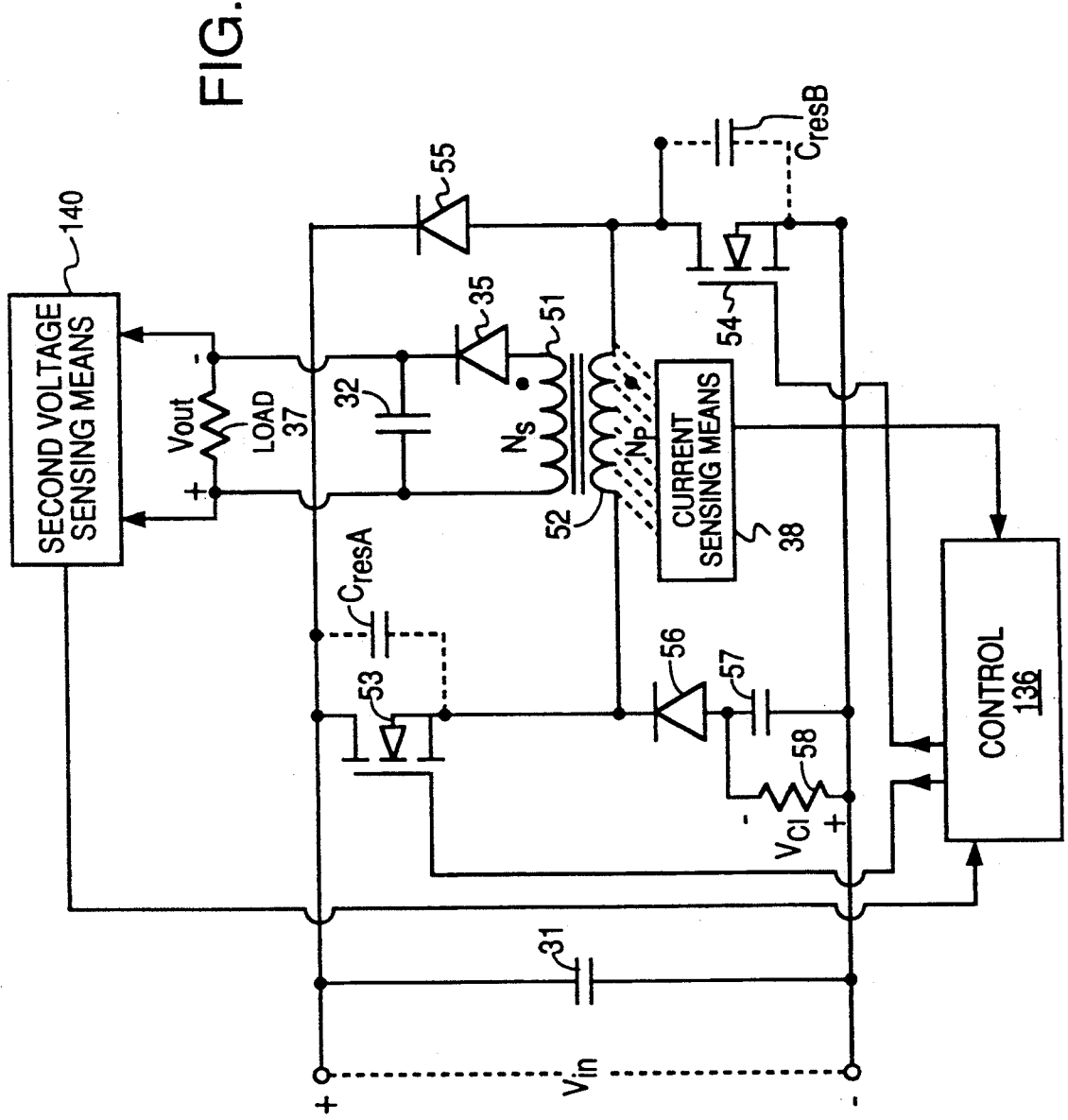
FIG. 19A shows a schematic of an isolated converter according to a fourth embodiment of the invention.

The zero voltage switching technique of the invention may also be implemented for other converter types. FIG. 19 shows a functional schematic diagram of a zero-voltage switched FM-PWM converter that provides an electrically isolated and regulated d-c output voltage. The output terminals ($V_{out}$) are isolated from the input terminals ($V_{in}$) due to a transformer formed by a secondary winding 51 having turns, Ns, and an inductor 52, which forms a primary winding having turns, Np. An appropriate magnetic core and the number of turns Np of inductor 52 provide the required inductance for energy storage and transfer as described above for the unisolated version of the converter. Secondary winding 51 is designed to yield the required output voltage following rectification by a diode 52.

The elements of this converter function identically to those in the unisolated version of FIG. 4 with the exception of the additional components needed to provide isolation and optional control of power transistor switch voltage. Two transistor switches 53 and 54 are used in this embodiment to maintain a limited maximum open transistor switch voltage only sufficient to ensure zero-voltage switching after the resonant ring down cycle as described above for the unisolated version. Transistors 53 and 54 are switched synchronously by controller 136 to switch inductor 52 across capacitor 31 and the input line voltage $V_{in}$. A clamp circuit consisting of clamp diodes 55 and 56, a clamp capacitor 57, and a clamp load 58 provide a clamped voltage $$V_{cl} \approx V_{in} - \frac{N_p}{N_s} V_{out}$$

which is the excess voltage across switch 53 made sufficient by design to insure zero voltage switching of transistors 53 and 54 after the resonant ring down cycle. This clamp voltage may be used as an unregulated (unisolated with respect to the input line) output voltage source for a number of useful functions such as powering primary control circuits or returning power to the input line with additional regulator circuitry.

The embodiments described above are intended to be exemplary and not limiting. In view of the above disclosure, modifications will be obvious to one of ordinary skill in the art without departing from the scope of the invention.

What is claimed is:

1. A zero-voltage switched FM-PWM regulated D-C to D-C converter circuit having an unregulated input line and a regulated output line, said converter circuit operatively connectable to a controller which controls the regulation and zero-voltage switching of said converter circuit, said converter circuit comprising:

an input filter capacitor to filter input voltage from said input line;

a first inductor coupled to receive input current from said input capacitor and said input line;

an output filter capacitor;

a diode;

a switching means coupled to said first inductor and having a conducting state and non-conducting state, said switching means for controlling the transfer of power from said first inductor to the output line and to said output filter capacitor through said diode;

a discrete capacitor connected directly across the switching means to reduce turn-off transient power dissipation in the switching means;

a current sensing means coupled to said first inductor to provide a signal indicative of the current flowing through said first inductor used to cause the controller to turn on the switching means when essentially a zero voltage is present across sad switching means; and a voltage to provide a signal to cause the controller to control the switching means conduction on-time and switching frequency to maintain the output line voltage essentially constant;

wherein said converter circuit is non-resonant.

2. The converter circuit of claim 1 wherein said switching means is a transistor.

3. The converter circuit of claim 1 wherein said switching means is the only switching means within said converter circuit that transfers power from said input line to said output line.

4. The converter circuit of claim 1 wherein said current sensing means is an inductive means magnetically coupled to said first inductor.

5. The converter circuit of claim 1 wherein said diode passes power from said first inductor to a load.

6. The converter circuit of claim 1 further comprising a signal conditioning means connected to said first current sensing means and to said controller.

7. A zero-voltage switched FM-PWM regulated D-C to D-C converter circuit having an unregulated input line and a regulated output line, said converter circuit operatively connectable to a controller which controls the regulation and zero-voltage switching of said converter circuit, said converter circuit comprising:
   an input filter capacitor to filter input voltage from said input line;
   a first inductor coupled to receive input current from said input capacitor and said input line;
   an output filter capacitor;
   a diode;
   a switching means coupled to said first inductor and having a conducting state and non-conducting state, said switching means for controlling the transfer of power from said first inductor to the output line and to said output filter capacitor through said diode;
   a discrete capacitor connected directly across the switching means to reduce turn-off transient power dissipation in the switching means;
   a first voltage sensing means coupled to said switching means for providing an output signal indicative of the voltage across said switching means, said output signal used to cause the controller to turn on the switching means when essentially a zero voltage is present across said switching means; and
   a second voltage sensing means to sample the output line voltage to provide a signal to cause the controller to control the switching means conduction on-time and switching frequency to maintain the output line voltage essentially constant;
   wherein said converter circuit is non-resonant.

8. The converter circuit of claim 7 wherein said diode passes power from said first inductor to a load.

9. The converter circuit of claim 7 wherein said switching means is a MOSFET.

10. The converter circuit of claim 7 wherein said first voltage sensing means includes a voltage comparator circuit for comparing a voltage of said switching means to a reference voltage.

11. A zero-voltage switched FM-PWM regulated D-C to D-C converter circuit having an unregulated input line and a regulated output line, said converter circuit operatively connectable to a controller which controls the regulation and zero-voltage switching of said converter circuit, said converter circuit comprising:
    an input filter capacitor to filter input voltage from said input line;
    an output filter capacitor;
    a diode;
    a transformer to provide DC isolation between the input line and the output line having a primary winding and a secondary winding, the primary winding coupled to said input line and the secondary winding coupled to the output filter capacitor and to the output line through said diode;
    a first switching means coupled to said transformer and having a conducting state and anon-conducting stat, said first switching means for controlling the transfer of power from a primary winding of said transformer to said secondary winding;
    a capacitor connected directly across the first switching means to reduce turn-off transient power dissipation in the first switching means;
    a first voltage sensing means coupled to said first switching means for providing an output signal indicative of the voltage across said first switching means and used to cause the controller to turn on the first switching means when essentially a zero voltage is present across said first switching means; and
    a second voltage sensing means coupled to sample the output line voltage to provide a signal to cause the controller to control the first switching means conduction on-time and switching frequency to maintain the output line voltage essentially constant;
    wherein said converter circuit is non-resonant.

12. The D-C to D-C converter of claim 11 further comprising a second switching means coupled to said transformer and having a conducting and a non-conducting state, said second switching means controlled synchronously with said first switching means to transfer power from the primary winding of said transformer to the secondary winding.

13. The DC to DC converter as recited in claim 12 wherein no more than two switching means are provided to control the transfer of power from the primary winding of said transformer to the secondary winding.

* * * * *